US007538144B2

(12) United States Patent
Vanmaele et al.

(10) Patent No.: US 7,538,144 B2
(45) Date of Patent: *May 26, 2009

(54) PHOTOREACTIVE POLYMERS

(75) Inventors: Luc Vanmaele, Lochristi (BE); Johan Loccufoer, Zwijnaarde (BE); Yu Chen, Mainz (DE); Holger Frey, Emmendingen (DE)

(73) Assignee: Agfa Graphics, N.V., Mortsel (BE)

( * ) Notice: Subject to any disclaimer, the term of this patent is extended or adjusted under 35 U.S.C. 154(b) by 331 days.

This patent is subject to a terminal disclaimer.

(21) Appl. No.: 11/170,349

(22) Filed: Jun. 29, 2005

(65) Prior Publication Data

US 2006/0014853 A1  Jan. 19, 2006

Related U.S. Application Data

(60) Provisional application No. 60/602,105, filed on Aug. 17, 2004, provisional application No. 60/647,614, filed on Jan. 27, 2005.

(30) Foreign Application Priority Data

Jul. 15, 2004  (EP) .................................. 04103387
Dec. 21, 2004  (EP) .................................. 04106771

(51) Int. Cl.
  *C08J 3/28*   (2006.01)
  *C08F 2/46*   (2006.01)

(52) U.S. Cl. ............................. 522/35; 522/25; 522/39; 522/42; 522/36; 522/904; 522/135; 522/136; 522/137; 522/142; 522/144; 522/148; 522/162; 522/178; 522/181; 522/182; 522/173

(58) Field of Classification Search .................... 522/35, 522/39, 42, 36, 904, 135, 136, 137, 142, 522/144, 148, 25, 162, 178, 181, 182, 173
See application file for complete search history.

(56) References Cited

U.S. PATENT DOCUMENTS

| 4,857,630 | A |  | 8/1989 | Kim |  |
|---|---|---|---|---|---|
| 5,196,502 | A |  | 3/1993 | Turner et al. |  |
| 5,214,122 | A |  | 5/1993 | Turner et al. |  |
| 5,225,522 | A |  | 7/1993 | Turner et al. |  |
| 5,506,279 | A |  | 4/1996 | Babu et al. |  |
| 5,538,548 | A |  | 7/1996 | Yamazaki |  |
| 6,087,412 | A |  | 7/2000 | Chabrecek et al. |  |
| 6,300,388 | B1 |  | 10/2001 | Verdonck et al. |  |
| 6,310,115 | B1 |  | 10/2001 | Vanmaele et al. |  |
| 2005/0014860 | A1 |  | 1/2005 | Herlihy |  |
| 2006/0014848 | A1 | * | 1/2006 | Loccufier et al. | ............... 522/25 |
| 2006/0014849 | A1 | * | 1/2006 | Vanmaele et al. | ............... 522/25 |
| 2006/0014851 | A1 | * | 1/2006 | Loccufier et al. | ............... 522/25 |
| 2006/0014852 | A1 | * | 1/2006 | Loccufier et al. | ............... 522/25 |

FOREIGN PATENT DOCUMENTS

| DE | 19947631 A1 | 6/2000 |
|---|---|---|
| EP | 0 434 098 A2 | 6/1991 |
| EP | 0 997 507 A1 | 5/2000 |
| EP | 1 344 805 A1 | 2/2003 |
| JP | 58198429 A2 | 11/1983 |
| JP | 61043627 A2 | 3/1986 |
| JP | 2000-086713 | 3/2000 |
| WO | WO 96/14346 A1 | 5/1996 |
| WO | WO 97/17378 A1 | 5/1997 |
| WO | WO 97/49664 A1 | 12/1997 |
| WO | WO 99/07746 A1 | 2/1999 |
| WO | WO 02/10189 A2 | 2/2002 |
| WO | WO 02/22700 A2 | 3/2002 |
| WO | WO 03/33452 A1 | 4/2003 |
| WO | WO 03/33492 A1 | 4/2003 |
| WO | WO 03/033492 A1 | 4/2003 |
| WO | WO 03/064502 A1 | 8/2003 |

OTHER PUBLICATIONS

Angiolini et al.; Polymeric photoinitiators based on side-chain benzoin methyl ether and tertiary amine moieties for fast UV-curable coatings; *Polymers for Advanced Technologies*; vol. 4, No. 6; pp. 375-384 (1993).
Burchard, W.; Solution properties of branched macromolecules. *Advanced in Polymer Science*; vol. 143, No. II; pp. 113-194 (1999).
Carlini et al.; Polymers for Advanced Technologies; 7(5 & 6); p. 379.
Corrales, T. et al.; Free radical macrophotoinitiators: an overview on recent advances; *Journal of Photochemistry and Photobiology A: Chemistry*; vol. 159, No. 2; pp. 103-114 (2003).
Crivello, J.V. et al.; Photoinitiators for Free Radical Cationic and Anionic Photopolymerization; *Surface Coatings Technology*; vol. III; pp. 208-224 (1998).
Davidson, S. et al.; Type II polymeric photo initiators with built-in amine synergist; *Journal of Photochemistry and Photobiology, A: Chemistry*; vol. 91, No. 2, pp. 153-163 (1995).
Davidson, S.; Exploring the Science Technology and Applications of UV and EB-curing; London, IK:SITA Technology Ltd.; p. 141 (1999).
Dworak, A. et al.; Cationic polymerization of glycidol; *Macromolecular Chemistry and Physics*; vol. 196, No. 6; pp. 1963-1970 (1995).
Frechet, J; Self-condensing vinyl polymerization: and approach to dendritic materials; *Science*; vol. 269, No. 5227; pp. 1080-1083 (1995).
Frey, H. et al.; Degree of branching in hyperbranched polymers; *Acta Polymerica*; vol. 50; pp. 67-76 (1999).
Gao, C. et al.; Hyperbranched polymers: from synthesis to application; *Progress in Polymer Science*; vol. 29, No. 3, pp. 183-275 (2000).
Hanselmann, R. et al; Hyperbranched Polymers Prepared via the Core-Dilution/Slow Addition Technique: Computer Simulation of Molecular Weight Distribution and Degree of Branching; *Macromolecules*; vol. 31, No. 12, pp. 3790-3801 (1998).

(Continued)

*Primary Examiner*—Sanza L McClendon
(74) *Attorney, Agent, or Firm*—Leydig, Voit & Mayer, Ltd

(57) ABSTRACT

A novel photoreactive polymer is disclosed comprising a dendritic polymer core with at least one initiating functional group and at least one co-initiating functional group. The photoreactive polymers are useful in radiation curable compositions are varnishes, lacquers, printing inks and radiation curable ink-jet inks. The dendritic polymeric core is preferably a hyperbranched polymer.

31 Claims, No Drawings

OTHER PUBLICATIONS

Hawker et al.; Preparation of polymers with controlled molecular architecture; *J. Am. Chem. Soc.*; vol. 112; p. 7638 (1990).

Holter, D. et al.; Degree of branching in hyperbranched polymers; *Acta Polymerica*; vol. 23, No. 48; pp. 30-35 (1997).

Holter, E.J. et al.; Degree of branching in hyperbranched polymers; *Acta Polymerica*; vol. 48, No. 8; pp. 298-309 (1997).

Jikei, M.; Hyperbranched polymers: a promising new class of materials; *Progress in Polymer Science*; vol. 26, No. 8; pp. 1233-1285 (2001).

Kim, Y. et al.; Hyperbranched polymers 10 years after; *Journal of Polymer Science, Part A: Polymer Chemistry*; vol. 36, No. 11; pp. 1685-1698 (1998).

Kim, Y.H et al.; Hyperbranched polyphenylenes. *Polymer Preprints (American Chemical Society, Division of Polymer Chemistry*; vol. 29, No. 2; pp. 310-311 (1988).

Maier, S. et al; Synthesis of poly(glycerol)-block-poly(methyl acrylate) multi-arm star polymers; *Macromolecular Rapid Communications*; vol. 21, No. 5; pp. 226-230 (2000).

Mc Cutcheon; Functional Materials, North American Edition; Glen Rock, N.J.: Manufacturing Confectioner Publishing Co.; pp. 110-129 (1990).

Radke, W. et al.; Effect of Core-Forming Molecules on Molecular Weight Distribution and Degree of Branching in the Synthesis of Hyperbranched Polymers; *Macromolecules*; vol. 31, No. 2; pp. 239-248 (1998).

Sunder, A. et al.; Controlled Synthesis of Hyperbranched Polyglycerols by Ring-Opening Multibranching Polymerization; *Macromolecules*; vol. 32, No. 13; pp. 4240-4246 (1999).

Sunder, A. et al.; Controlling the growth of polymer tress: concepts and perspectives for hyperbranched polymers; *Chemistry- A European Journal*; vol. 6, No. 14; pp. 2499-2506 (2000).

Sunder, A. et al.; Hyperbranched Polyether-Polyols Based on Polyglycerol: Polarity Design by Block Copolymerization with Propylene Oxide; *Macromolecules*; vol. 33, No. 2; pp. 309-314 (2000).

Tokar, R. et al.; Cationic polymerization of glycidol: coexistence of the activated monomer and active chain end mechanism; *Macromolecules*; vol. 27; p. 320 (1994).

Tomalia et al.; A new class of polymers: starburst-dendritic macromolecules. *Polymer J.*; vol. 17; p. 117 (1985).

Vandenberg, E.J.; Polymerization of glycidol and its derivatives: a new rearrangement polymerization; *Journal of Polymer Science*; vol. 23, No. 4, pp. 915-949 (1985).

Voit, B. et al.; New Developments in hyperbranched polymers; *Journal of Polymer Science, Part A: Polymer Chemistry*; vol. 38, No. 14; pp. 2505-2525 (2000).

European Search Report in 04 10 3387 (Sep. 5, 2005).

European Search Report in 04 10 3389 (Sep. 6, 2005).

European Search Report in 04 10 3391 (Sep. 2, 2005).

Pouliquen et al.; "Functionalized Polysiloxanes with Thioxanthobe Side Groups: A Study of Their Reactivity as Radical Polymerization;" *Macromolecules*; vol. 28 No. 24; pp. 8028-8034 (Nov. 20, 1995).

* cited by examiner

PHOTOREACTIVE POLYMERS

CROSS-REFERENCE TO RELATED PATENT APPLICATIONS

This application claims the benefit of U.S. Provisional Application No. 60/647,614 filed Jan. 27, 2005, which is incorporated by reference. In addition, this application claims the benefit of European Application No. 04106771 filed Dec. 21, 2004, which is also incorporated by reference. In addition, this application claims the benefit of European Application No. 04103387 filed Jul. 15, 2004, which is also incorporated by reference. In addition, this application claims the benefit of U.S. Provisional Application No. 60/602,105 filed Aug. 17, 2004, which is also incorporated by reference.

TECHNICAL FIELD

The present invention relates to novel photoreactive polymers, useful in radiation curable compositions such as varnishes, lacquers and printing inks and especially useful in radiation curable ink-jet inks.

BACKGROUND ART

The vast majority of commercial radiation curable compositions contain low molecular weight photo-initiators and co-initiators. When low molecular weight products are not built into the polymer network, they are prone to diffuse out of the cured composition and can readily be extracted. When radiation curable compositions are used for food packaging or dental applications, the amount of extractable residues is a critical issue and needs to be minimized.

Especially Norrish type II initiators are a point of concern regarding extractable residues. Norrish type II photo-initiators always require a co-initiator. A co-initiator or synergist is basically a molecule capable of transferring a hydrogen atom to the excited state of the Norrish type II initiator. Aliphatic tertiary amines, aromatic amines and thiols are preferred examples of co-initiators. After transfer of a hydrogen atom to the Norrish type II initiator, the radical generated on the synergist initiates the polymerization. Theoretically the co-initiator is built into the polymer network. However, it is highly unlikely that both the hydrogen transfer and the initiation reaction yields are a hundred percent. Side reactions are likely to occur leaving unreacted synergist and side products in the composition. In food packaging printed upon with such a radiation curable composition, these low molecular weight residues remain mobile and if toxic will cause health risks upon being extracted into the food.

One approach in solving these problems is to design co-initiators and Norrish type II initiators with a higher molecular weight.

JP 2000086713 (TOYO INK) discloses the use of the reaction product of an unsaturated monomer bearing (meth)acryloyl groups or vinyl ether groups having an number average molecular weight of more than 500 with a primary or secondary amine as co-initiator in radiation curable compositions. However, using this approach only co-initiators with low functionality can be obtained.

EP 434098 A (UNION CARBIDE) discloses the use of amino terminated polyoxyalkylenes as co-initiators in radiation curable compositions. The claimed polyoxyalkylenes also have a low functionality, requiring the use of large amounts of unreactive polymer in the matrix compared to low molecular weight co-initiators.

WO 0222700 (PERSTORP SPECIALTY CHEM) discloses a radiation curable dendritic oligomer or polymer, characterised in that the radiation curable dendritic oligomer or polymer normally has at least one terminal group of Formula (A):

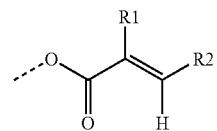

Formula (A)

and normally at least one terminal group of Formula (B):

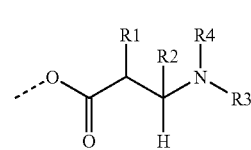

Formula (B)

wherein R1 and R2 individually are hydrogen or methyl and wherein R3 and R4 individually are alkyl, aryl, alkylaryl, arylalkyl, alkylalkoxy, arylalkoxy, said alkyl and/or said aryl optionally having one or more hydroxyl groups. The dendritic polymers are claimed to be of particular interest for curing under air compared to conventional curable dendritic oligomers. However, these oligomeric co-initiators tend to lose their effectiveness when coupled to a polymer, which does not contain acrylates, as stated in DAVIDSON, Stephen R. Exploring the Science Technology and Applications of UV and EB-curing. LONDON, UK: SITA Technology Ltd, 1999. p. 141. and DAVIDSON, Stephen R., et al. Type II polymeric photoinitiators (polyetherimides) with built-in amine synergist. *Journal of Photochemistry and Photobiology, A: Chemistry*. 1995, vol. 91, no. 2, p. 153-163.

Polymeric initiators have been disclosed in CRIVELLO, J. V., et al. Photoinitiators for Free Radical Cationic and Anionic Photopolymerisation. *Surface Coatings Technology*. 1998, vol. III, p. 208-224. and CORRALES, T., et al. Free radical macrophotoinitiators: an overview on recent advances. *Journal of Photochemistry and Photobiology A: Chemistry*. 2003, vol. 159, no. 2, p. 103-114. All the disclosed polymeric initiators have a conventional linear molecular geometry. The solution viscosity of a radiation curable composition is influenced significantly using these polymeric initiators.

WO 03033452 (COATES BROTHERS PLC) discloses multifunctional benzophenone initiators having the following general structure:

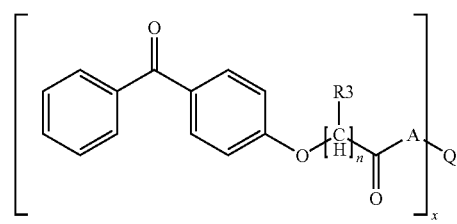

where n is a number from 1 to 6; R3 is hydrogen, methyl or ethyl; A represents a group of formula —[O(CHR$^2$CHR$^1$)$_a$]$_y$—, —[O(CH$_2$)$_b$CO]$_y$, or —[O(CH$_2$CO]$_{(y-1)}$—[O(CHR$^2$CHR$^1$)$_a$]— (where one of R$^1$ and R$^2$ is hydrogen and the other is hydrogen, methyl or ethyl); a is from 1 to 2; b is from 4 to 5; y is from 3 to 10; Q is a residue of a polyhydroxy compound having 2 to 6 hydroxyl groups; and x is greater than 1 but no greater than the number of available hydroxyl groups in Q.

WO 03033492 (COATES BROTHERS PLC) discloses similar polymeric initiators having the following structure:

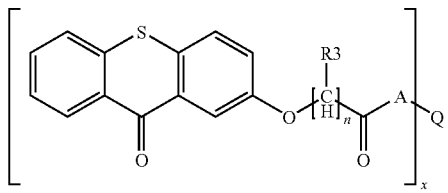

where n is a number from 1 to 6; R3 is hydrogen, methyl or ethyl; A represents a group of formula —[O(CHR$^2$CHR$^1$)$_a$]$_y$—, —[O(CH$_2$)$_b$CO]$_y$, or —[O(CH$_2$CO]$_{(y-1)}$—[O(CHR$^2$CHR$^1$)$_a$]— (where one of R$^1$ and R$^2$ is hydrogen and the other is hydrogen, methyl or ethyl); a is from 1 to 2; b is from 4 to 5; y is from 3 to 10; Q is a residue of a polyhydroxy compound having 2 to 6 hydroxyl groups; and x is greater than 1 but no greater than the number of available hydroxyl groups in Q.

Both WO 03033452 (COATES BROTHERS PLC) and WO 03033492 (COATES BROTHERS PLC) teach that the molecular weight of the multifunctional initiators is most preferably lower than 800, since higher molecular weights cause an unwanted increase in the viscosity of the radiation curable formulation. This limits the functionality of the multifunctional initiator and limits the possibilities to optimize physical properties, such as the compatibility with different radiation curable compositions, to the choice of Q. Using part of the hydroxyl groups of the core to introduce moieties for optimization of physical properties would lead to multifunctional initiators with a low functionality. High concentrations of photoinitiators would then be needed to obtain the required curing sensitivity, thus limiting the possibilities for the composition and having a large influence on the properties of the composition and the final result.

WO 9717378 (COATES BROTHERS PLC) discloses a different type of multifunctional initiators obtained by the reaction of a multifunctional core material containing two or more reactive groups and a photoinitiator or derivative thereof. The photoinitiator or derivative thereof has a reactive group capable of reacting with the reactive groups of the multifunctional core. The photoinitiators disclosed in WO 9717378 (COATES BROTHERS PLC) are low molecular weight compounds, having a maximum functionality of 6. Depending on the functionality of the polyfunctional initiator, the molecular weight of the core is preferably less than 500 for a difunctional initiator, preferable less than 1000 for a tetrafunctional initiator and less than 1500 for a hexafunctional initiator. For ink-jet applications, a further increase of molecular weight would lead to an unacceptable viscosity of the radiation curable ink-jet ink.

WO 9749664 (LAMBSON FINE CHEMICALS) discloses a photoinitiator, comprising a photoreactive portion and a pendant group, the photoreactive portion including an aromatic moiety and the pending group incorporating at least one optionally substituted poly(alkylene glycol) moiety. Preferred photoreactive portions include optionally substituted benzophenone, thioxanthone and anthraquinone compounds substituted by a polyethylene glycol or polypropylene glycol moiety of an average molecular weight in the range 150 to 900. These types of initiators are essentially monofunctional. The molecular weight per photoreactive moiety is high. For an equal molar initiator concentration, a high weight percentage of these macromolecular initiators are required compared to their low molecular weight counterparts. As a result a high amount of unreactive polymer is introduced in the radiation curable formulation, having a negative influence on physical properties such as scratch resistance.

Especially in ink-jet applications, a significant increase in the solution viscosity has to be avoided to keep the ink-jet ink jettable. One approach to reduce problems of high viscosity and low functionality caused by these polymeric initiators and co-initiators is to combine the initiator and co-initiator in the same macromolecule.

Some combinations of a co-initiator and an initiator in a polymer have been described. Poly(ethylene imines) derivatized with thioxanthone moieties have been reported by Jiang et al. (Polymer, 45 (2004), 133-140).

In another approach, Jiang and Yin reported the polycondensation product of specific thioxanthone-derivatives with amines as the combination of Norrish type II photoinitiator and a synergist in the same polymer (Polymer, 45 (2004), 5057-5063).

Amine modified polyether imides have been reported by Davidson et al. (Journal of Photochemistry and Photobiology, A: Chemistry (1995), 91(2), 153-163), while Angiolini et al. reported acrylate copolymers having both an initiating moiety and a tertiary amine (benzoin methyl ethers and tertiary amines: Polymers for Advanced Technologies (1993), 4(6), 375-384; benzophenones and tertiary amines: New Polymeric Materials (1987), 1 (1), 63-83; camphorquinone and tertiary amines: Macromolecular Chemistry and Physics (2000), 201(18), 2646-2653; thioxanthones and α-morpholinoketones: Polymer (1995), 36(21), 4055-60).

Also in two recent reviews, polymers having both an initiating and a co-initiating moiety have been reported (Corrales et al. in Journal of Photochemistry and Photobiology, A: Chemistry (2003), 159(2), 103-114 and Carlini et al. in Polymers for Advanced Technologies (1996), 7(5 & 6), 379-384).

Although several of these polymers show interesting photochemical properties, all of them have a linear geometry. Using these photoreactive polymers, the solution viscosity still increases to an undesirable level for a great number of applications with radiation curable compositions, e.g. ink-jet inks and lacquers.

There is therefore a need to provide cheap, effective photoreactive polymers suitable for radiation curable compositions for use on food packaging with these photoreactive polymers not being extractable into food or adversely affecting the physical properties of the packaging material. The photoreactive polymers should be easy to manufacture and should be compatible with a wide range of radiation curable compositions without causing high solution viscosity.

OBJECTS OF THE INVENTION

It is an object of the present invention to provide a new class of very effective photoreactive polymers.

It is a further object of the present invention to provide a new class of photoreactive polymers that are easy to manufacture and can be easily made compatible with a wide range of radiation curable compositions.

It is also an object of the present invention to provide a radiation curable composition comprising at least one photoreactive polymer of this new class of very effective photoreactive polymers.

It is also an object of the present invention to provide a radiation curable ink-jet ink comprising at least one photoreactive polymer of a new class of very effective photoreactive polymer suitable for ink-jet printing on food packaging.

These and other objects of the invention will become apparent from the description hereinafter.

SUMMARY OF THE INVENTION

It was surprisingly found that photoreactive polymers having a hyperbranched polymeric core with initiating and co-initiating functional groups thereon were at least as effective as a combination of both low molecular weight initiator and co-initiator. Although the photoreactive polymers had a high functionality, they exhibited a limited influence on viscosity, which widened the options for composing radiation curable ink-jet inks.

Objects of the present invention are realized with a photoreactive polymer comprising a dendritic polymer core with at least one initiating functional group and at least one co-initiating functional group.

The objects of the present invention are also realized with a radiation curable composition containing a photoreactive polymer comprising a dendritic polymer core with at least one initiating functional group and at least one co-initiating functional group.

The objects of the present invention are also realized with a radiation curable ink-jet ink containing a photoreactive polymer comprising a dendritic polymer core with at least one initiating functional group and at least one co-initiating functional group.

The objects of the present invention are also realized with a process for manufacturing a photoreactive polymer, comprising the steps of:

a) providing a dendritic polymer core, and b) attaching at least one co-initiator or co-initiator derivative to said dendritic polymer core, and c) attaching at least one initiator or initiator derivative to said dendritic polymer core.

The objects of the present invention are also realized with a process for manufacturing a photoreactive polymer, comprising the steps of:

a) providing a dendritic polymer core wherein a co-initiator is part of the dendritic polymer core, and b) attaching at least one initiator or initiator derivative to said dendritic polymer core.

Further advantages and embodiments of the present invention will become apparent from the following description.

DETAILED DESCRIPTION OF THE INVENTION

Definitions

The term "actinic radiation" as used in disclosing the present invention, means electromagnetic radiation capable of initiating photochemical reactions.

The term "ultraviolet radiation" as used in disclosing the present invention, means electromagnetic radiation in the wavelength range of 4 to 400 nanometers.

The term "UV" is used in disclosing the present application as an abbreviation for ultraviolet radiation.

The term "initiator" as used in disclosing the present invention, means a Norrish type I initiator, a Norrish type II initiator or a photo-acid generator.

The term "Norrish Type I initiator" as used in disclosing the present invention, means an initiator which cleaves after excitation, yielding the initiating radical immediately.

The term "Norrish type II-initiator" as used in disclosing the present invention, means a photoinitiator which is activated by actinic radiation and forms free radicals by hydrogen abstraction or electron extraction from a second compound that becomes the actual initiating free radical.

The term "co-initiator" as used in disclosing the present invention, means any molecule capable of transferring a hydrogen to the excited state of a Norrish type II-initiator and initiating the radical polymerization of a radiation curable composition.

The term "branched polymer" as used in disclosing the present invention, means a polymer chain having branch points that connect three or more polymeric chain segments.

The term "DB" is used in disclosing the present application as an abbreviation for degree of branching.

The term "dendritic polymer" as used in disclosing the present invention, comprises dendrimers and hyperbranched polymers.

The term "hyperbranched polymer" as used in disclosing the present invention, means a polymer having a plurality of branch points and multifunctional branches that lead to further branching with polymer growth. Hyperbranched polymers are obtained by a one-step polymerization process and form a polydisperse system with varying degrees of branching (DB<100%).

The term "dendrimers" as used in disclosing the present invention, means well-defined monodisperse structures in which all branch points are used (DB=100%). Dendrimers are obtained by a multi-step synthesis.

The term "functional group" as used in disclosing the present invention, means an atom or group of atoms, acting as a unit, that has replaced a hydrogen atom in a hydrocarbon molecule and whose presence imparts characteristic properties to this molecule.

The term "low functionality" as used in disclosing the present invention, means having not more than five functional groups.

The term "end group" as used in disclosing the present invention, means the terminal group on a branch. In the case of a dendrimer or hyperbranched polymer, a plurality of end groups is present.

The term "initiating functional group" as used in disclosing the present invention, means a functional group that renders the molecule capable of functioning as a initiator.

The term "co-initiating functional group" as used in disclosing the present invention, means a functional group that renders the molecule capable of functioning as a co-initiator.

The term "colorant", as used in disclosing the present invention, means dyes and pigments.

The term "dye", as used in disclosing the present invention, means a colorant having a solubility of 10 mg/L or more in the medium in which it is applied and under the ambient conditions pertaining.

The term "pigment" is defined in DIN 55943, herein incorporated by reference, as an inorganic or organic, chromatic or achromatic colouring agent that is practically insoluble in the application medium under the pertaining ambient conditions, hence having a solubility of less than 10 mg/L therein.

The term "alkyl" means all variants possible for each number of carbon atoms in the alkyl group i.e. for three carbon atoms: n-propyl and isopropyl; for four carbon atoms: n-butyl, isobutyl and tertiary-butyl; for five carbon atoms: n-pentyl, 1,1-dimethyl-propyl, 2,2-dimethylpropyl and 2-methylbutyl etc.

The term "acyl group" as used in disclosing the present invention means —(C═O)-aryl groups, —(C═O)-alkyl groups, —(C═O)-heterocyclic groups and —(C═O)-heteroaromatic groups.

The term "aliphatic group" as used in disclosing the present invention means saturated straight chain, branched chain and alicyclic hydrocarbon groups.

The term "aryl group" as used in disclosing the present invention means an assemblage of cyclic conjugated carbon atoms, which are characterized by large resonance energies, e.g. benzene, naphthalene and anthracene. The term "aromatic group" is synonymous for the term "aryl group".

The term "alicyclic hydrocarbon group" means an assemblage of cyclic conjugated carbon atoms, which do not form an aromatic group, e.g. cyclohexane.

The term "substituted" as used in disclosing this invention means that one or more of the carbon atoms and/or that a hydrogen atom of one or more of carbon atoms in an aliphatic group, an aromatic group or an alicyclic hydrocarbon group, are replaced by an oxygen atom, a nitrogen atom, a sulphur atom, a selenium atom or a tellurium atom. Such substituents include hydroxyl groups, ether groups, carboxylic acid groups, ester groups, amide groups and amine groups.

The term "heteroaromatic group" means an aromatic group wherein at least one of the cyclic conjugated carbon atoms is replaced by an oxygen atom, a nitrogen atom, a sulphur atom, a selenium atom or a tellurium atom.

The term "heterocyclic group" means an alicyclic hydrocarbon group wherein at least one of the cyclic conjugated carbon atoms is replaced by an oxygen atom, a nitrogen atom, a sulphur atom, a selenium atom or a tellurium atom.

Dendritic Polymers

The photoreactive polymer according to the present invention contains a core of dendritic polymer, e.g. a dendrimer or a hyperbranched polymer. The photoreactive polymer according to the present invention has preferably a core of hyperbranched polymer.

Dendrimers are characterized by cascade-type branching, i.e. a branch-on-branch topology. Dendrimers are prepared in a multi-step synthesis, based on repeated branching and deprotection schemes as disclosed by NEWCOME, G. R., et al. Dendritic Molecules: Concepts, Synthesis, Perspectives. VCH: WEINHEIM, 2001. Dendrimer synthesis strategies generally aim at fully branched polymers, although in recently reported examples a fraction of imperfectly branched species has been reported as (undesired) side-products. Suitable dendrimers are polyamidoamine (PAMAM) Starburst™ dendrimers as disclosed by TOMALIA, et al. A new class of polymers: starburst-dendritic macromolecules. *Polym. J.* 1985, vol. 17, p. 117. and convergently prepared polybenzylether dendrimers as disclosed by HAWKER, et al. Preparation of polymers with controlled molecular architecture. A new convergent approach to dendritic macromolecules. *J. Am. Chem. Soc.* 1990, vol. 112, p. 7638.

Synthesis

The stepwise preparation, which represents the only strategy for the preparation of dendrimers at present, is a limiting factor for most applications. In contrast to dendrimers, the structurally irregular, i. e. hyperbranched polymers are obtained in a single synthetic step.

In the present invention both polymers obtained by strict hyperbranching polymerization as well as polymers obtained by subcritical polymerization of e.g. $A_2+B_3$ types of monomers are considered as hyperbranched.

A stringent criterion for strict hyperbranching polymerization is that no critical conversion $p_c$ may exist, at which gelation of the system occurs and a network structure is obtained, as disclosed by BURCHARD, W., et al. Solution properties of branched macromolecules. *Advances in Polymer Science.* 1999, vol. 143, no. II, p. 113-194.

Hyperbranched materials can thus be obtained by polycondensation of $AB_2$ or $AB_m$-type monomers with complementary functionality's A and B, the only coupling reaction in the system being the linking of A and B. Details on this type of polyfunctional polycondensation are disclosed by FLORY, P. J., et al. Molecular size distribution in three-dimensional polymers. VI. Branched polymer containing A-R-Bf-1-type units. *Journal of the American Chemical Society.* 1952, vol. 74, p. 2718-2723.

U.S. Pat. No. 4,857,630 (DU PONT) and KIM, Y. H., et al. Hyperbranched polyphenylenes. *Polymer Preprints (American Chemical Society, Division of Polymer Chemistry).* 1988, vol. 29, no. 2, p. 310-311. disclose synthesis methods for preparing hyperbranched polyphenylenes.

Methods for preparing hyperbranched polymers based on polycondensation of $AB_2$-monomers are further disclosed in U.S. Pat. No. 5,196,502 (KODAK), U.S. Pat. No. 5,225,522 (KODAK) and U.S. Pat. No. 5,214,122 (KODAK).

Another suitable approach for preparing hyperbranched polymer structures is the polymerization of linear AB*-type inimers. Inimers are compounds that possess a common, linearly polymerizable moiety, such as a vinyl group or a strained cyclic component as well as an initiating group in the same molecule. Cyclic inimers have been used in the preparation of hyperbranched structures by VANDENBERG, E. J., et al. Polymerization of glycidol and its derivatives: a new rearrangement polymerization. *Journal of Polymer Science.* 1985, vol. 23, no. 4, p. 915-949., FRECHET, J., et al. Self-condensing vinyl polymerization: an approach to dendritic materials. *Science (Washington, D.C.).* 1995, vol. 269, no. 5227, p. 1080-1083. and EP 791021 A (CORNELL RES FOUNDATION INC).

Linear AB type compounds, commonly called "linear co-monomers" as well as poly-B-functional compounds of $B_f$-structure may be present, commonly designated "core molecules". An overview of the structural possibilities as well as a stringent definition for the degree of branching DB, a relevant parameter for the functionality of hyperbranched polymers is disclosed by HOLTER, et al. Degree of branching in hyperbranched polymers. *Acta Polymerica.* 1997, vol. 23, no. 48, p. 30-35., HOLTER, et al. Degree of branching (DB) in hyperbranched polymers. Part 2. Enhancement of the DB. Scope and limitations. *Acta Polymerica.* 1997, vol. 48, no. 8, p. 298-309. and FREY, H., et al. Degree of branching in hyperbranched polymers. Part 3. Copolymerization of ABm monomers with AB and ABn monomers. *Journal of Polymer Science.* 1999, vol. 50, no. 2-3, p. 67-76.

The state of the art in hyperbranched polymer research has been reviewed in:

(a) JIKEI, M., et al. Hyperbranched polymers: a promising new class of materials. *Progress in Polymer Science.* 2001, vol. 26, no. 8, p. 1233-1285.

(b) NEWCOME, G. R., et al. Dendritic Molecules: Concepts, Synthesis, Perspectives. VCH: WEINHEIM, 2001.

(c) KIM, Y., et al. Hyperbranched polymers 10 years after. *Journal of Polymer Science, Part A. Polymer Chemistry.* 1998, vol. 36, no. 11, p. 1685-1698.

(d) VOIT, B., et al. New developments in hyperbranched polymers. *Journal of Polymer Science, Part A: Polymer Chemistry.* 2000, vol. 38, no. 14, p. 2505-2525.

(e) SUNDER, A., et al. Controlling the growth of polymer trees: concepts and perspectives for hyperbranched polymers. *Chemistry—A European Journal* 2000, vol. 6, no. 14, p. 2499-2506.

From these reviews, it is evident that hyperbranched polymers are clearly distinguishable from the regularly branched dendrimers as well as from branched structures based on $A_2+B_3$ polymerization of two polyfunctional monomers that inevitably leads to gelation, i.e. network formation, if polymerization is not stopped at a subcritical level.

Hyperbranched polymers commonly possess broad molecular weight distribution. The polydispersity $M_w/M_n$ is usually greater than 5 and more often greater than 10. Recently new concepts have been introduced that are based on the slow addition of $AB_2$ or latent $AB_2$ monomers of suitable reactivity to a polyfunctional ($B_f$) core molecule. The procedure is disclosed by RADKE, W., et al. Effect of Core-Forming Molecules on Molecular Weight Distribution and Degree of Branching in the Synthesis of Hyperbranched Polymers. *Macromolecules.* 1998, vol. 31, no. 2, p. 239-248. and HANSELMANN, R., et al. Hyperbranched Polymers Prepared via the Core-Dilution/Slow Addition Technique: Computer Simulation of Molecular Weight Distribution and Degree of Branching. *Macromolecules.* 1998, vol. 31, no. 12, p. 3790-3801.

Hyperbranched Polymer Core

The size of the hyperbranched polymer core for a photoreactive polymer according to the present invention is determined by the selected application. Most ink-jet applications require ink-jet inks with a low viscosity, usually lower than 100 mPa·s. Hence for ink-jet applications, the hyperbranched polymers preferably have a $M_w$ smaller than 100,000, more preferably smaller than 50,000 and most preferably smaller than 20,000.

The hyperbranched polymer core for a photoreactive polymer according to the present invention is preferably obtained by the method of slow monomer addition. This results in a narrow polydispersity of the hyperbranched polymers. Particularly preferred in the present invention are hyperbranched polymers with a polydispersity $M_w/M_n$ smaller than 3.

Suitable hyperbranched polymer cores are disclosed in GAO, C., et al. Hyperbranched polymers: from synthesis to applications. *Progress in Polymer Science.* 2000, vol. 29, no. 3, p. 183-275.

Other suitable hyperbranched polymer cores are given in Table 1, without being limited thereto.

TABLE 1

PC-1

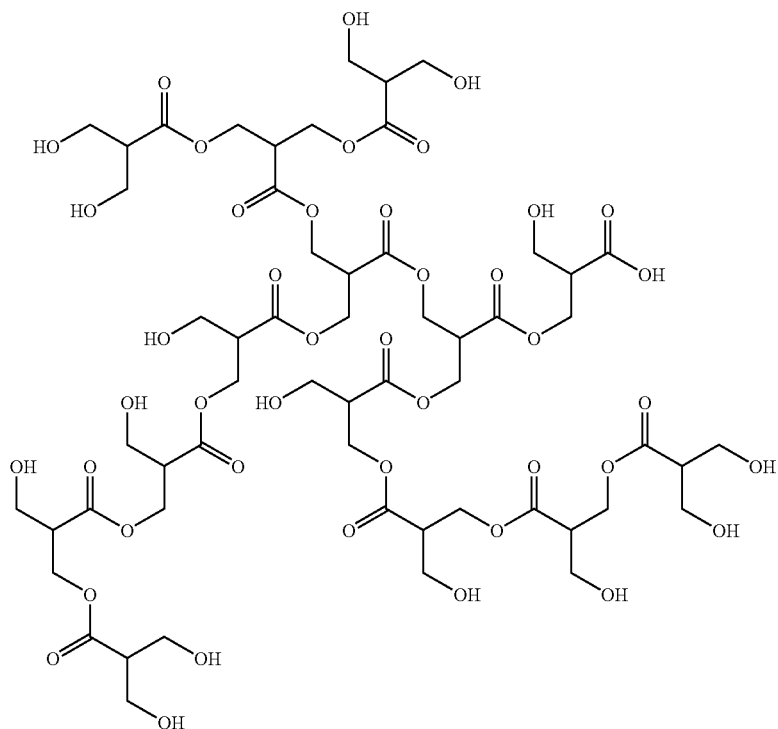

TABLE 1-continued
PC-2
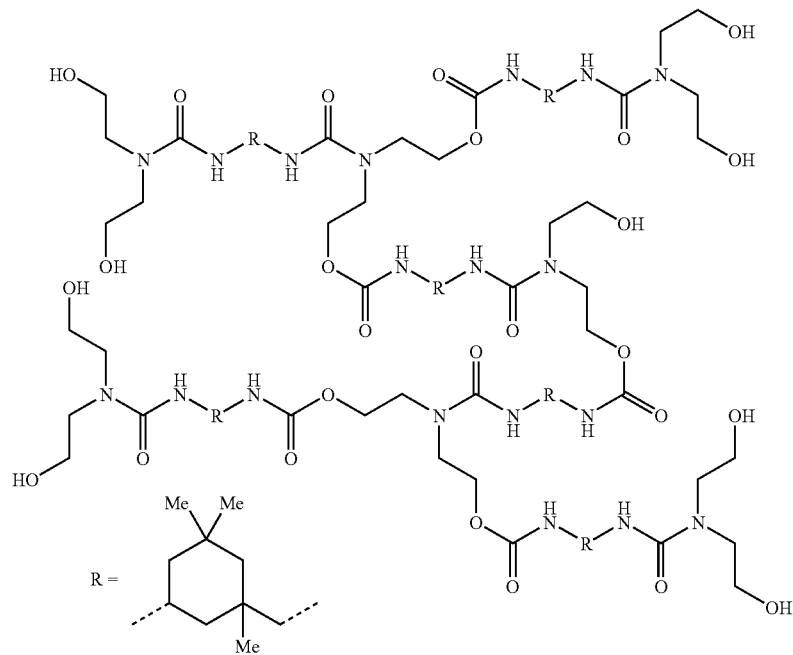
PC-3
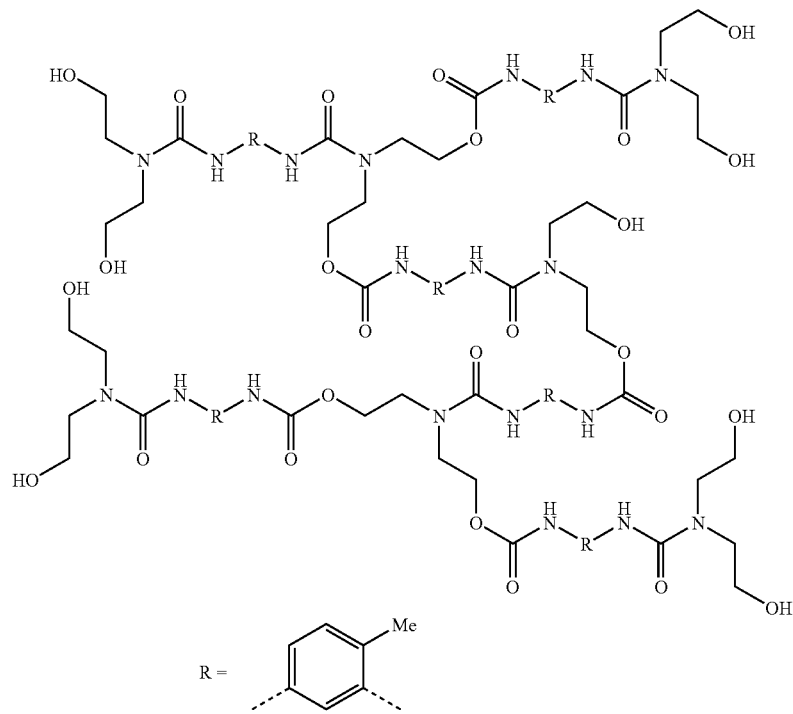

TABLE 1-continued
PC-4
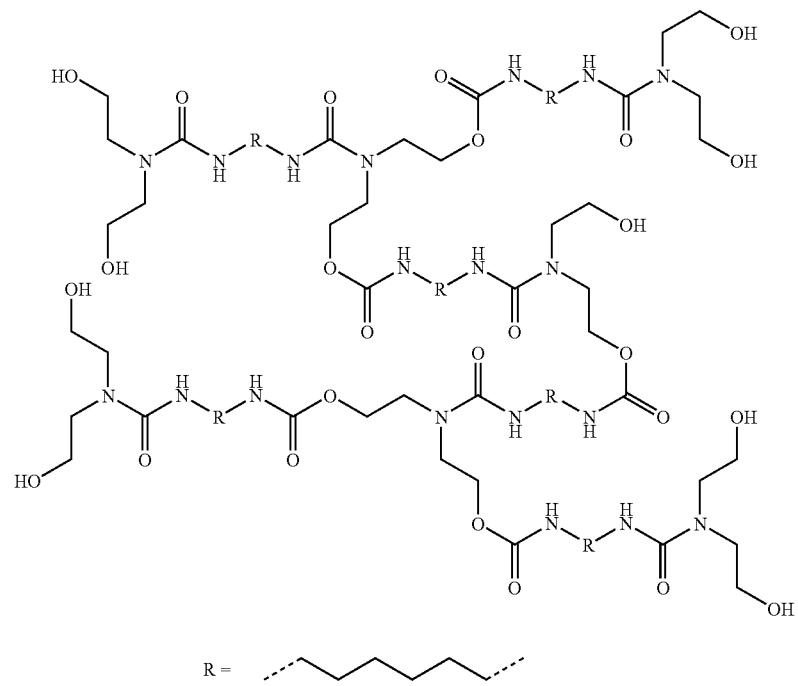
PC-5
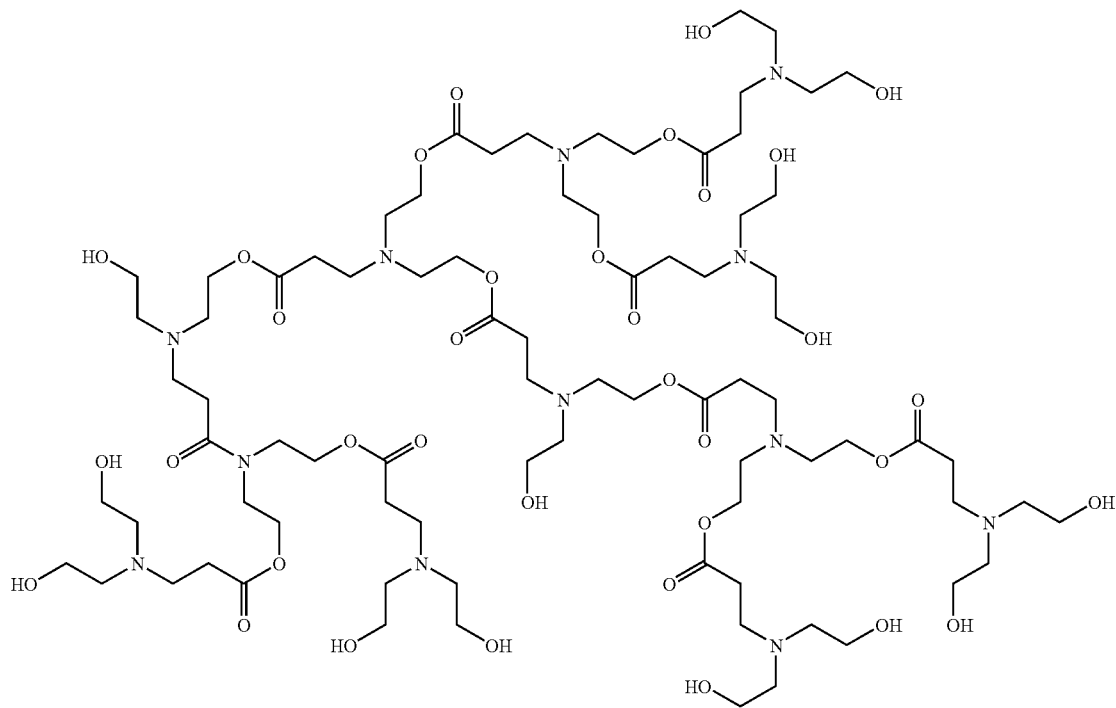

TABLE 1-continued
PC-6
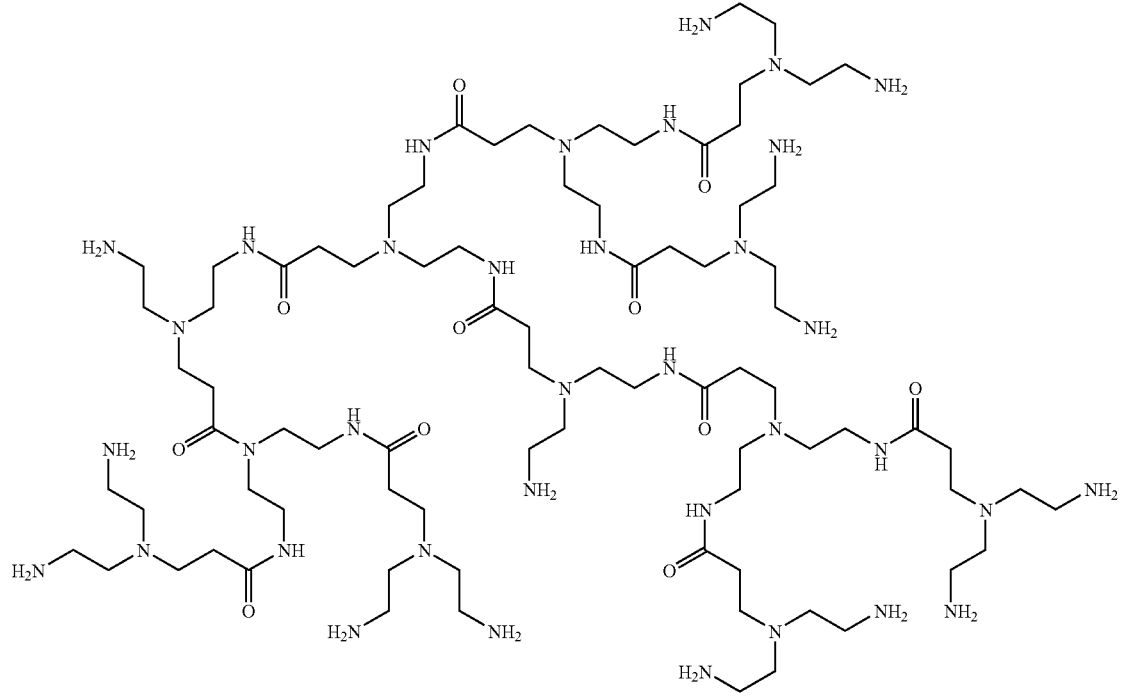
PC-7
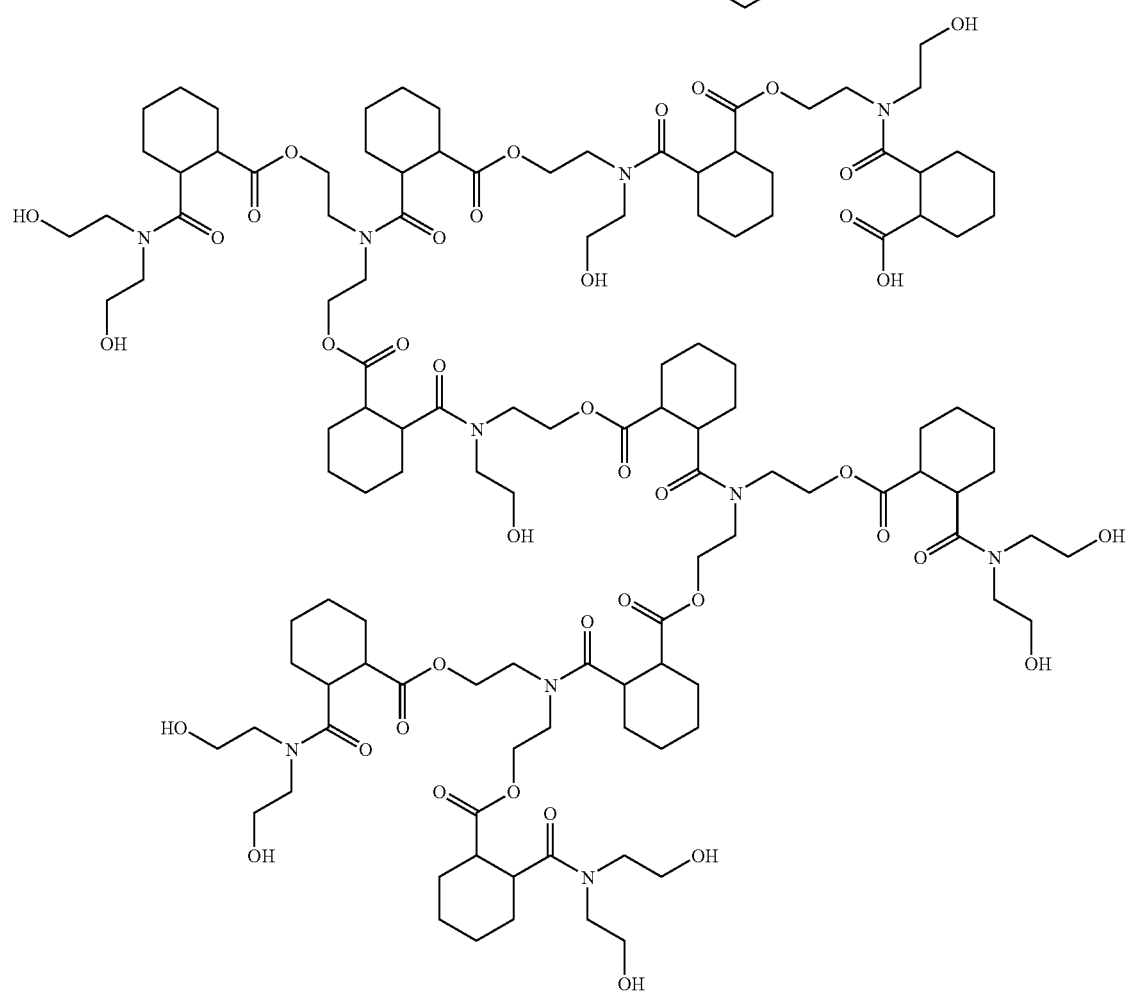

TABLE 1-continued

PC-8

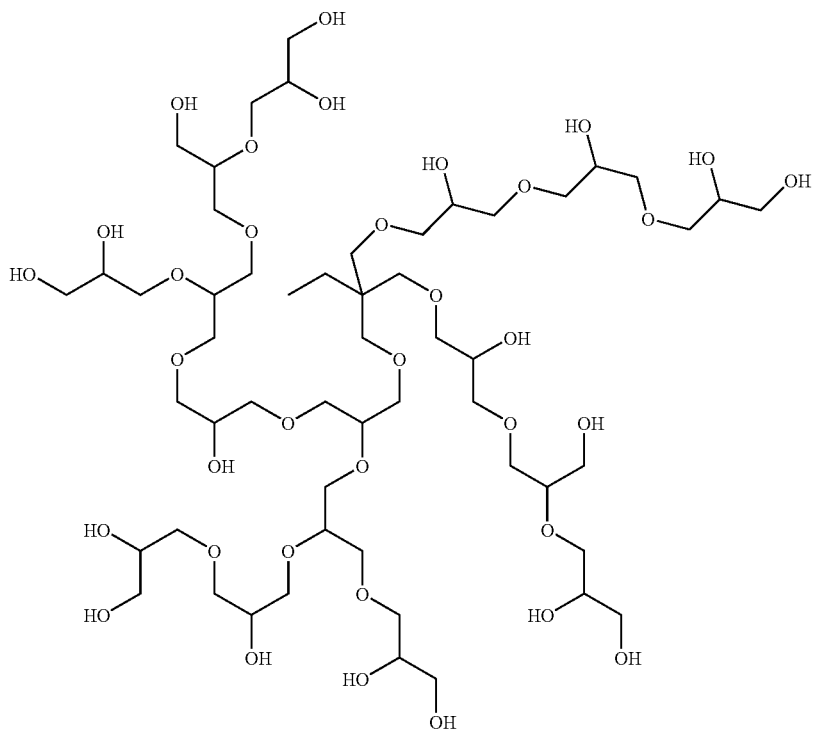

The hyperbranched polymer core can be used as a core for terminal grafting before derivatization with a reactive co-initiator (derivative) and initiator (derivative). This yields a hyperbranched multiple arm graft star copolymer, which is also considered to be a hyperbranched polymer core. Suitable examples of this type of polymers are disclosed in SUNDER, A, et al. Hyperbranched Polyether-Polyols Based on Polyglycerol: Polarity Design by Block Copolymerization with Propylene Oxide. *Polyglycerol: Polarity Design by Block Copolymerizatlon with Propylene Oxide. Macromolecules.* 2000, vol. 22, no. 3, p. 309-314. and MAIER, S., et al. Synthesis of poly(glycerol)-block-poly(methyl acrylate) multi-arm star polymers. *Macromolecular Rapid Communications.* 2000, vol. 21, no. 5, p. 226-230.

Any hyperbranched polymer can be used as a polymer core in the photoreactive polymers, but hyperbranched polyglycidols or hyperbranched copolymers of glycidol and other epoxides are particularly preferred. They can be readily prepared with a narrow molecular weight distribution in a single step procedure from commercially available monomers over a broad range of molecular weights. The reaction of these core polymers with at least one co-initiator or co-initiator derivative and with at least one initiator or initiator derivative yields a particularly preferred class of hyperbranched photoreactive polymers according to the present invention.

Branched polyols based on glycerol units are usually prepared by reacting glycidol with a hydrogen-containing compound (e.g., glycerol) in the presence of inorganic acids as disclosed by JP 61043627 A (DAICEL CHEM IND.) or organic acids as disclosed by JP 58198429 A (NIPPON YUSHI) as catalyst. The polymerization of glycidol can also be achieved via cationic polymerization using cationic initiators, such as $BF_3$ as disclosed by TOKAR, R., et al. Cationic polymerisation of glycidol: coexistence of the activated monomer and active chain end mechanism. *Macromolecules.* 1994, vol. 27, p. 320. and DWORAK, A., et al. Cationic polymerization of glycidol. Polymer structure and polymerization mechanism. *Macromolecular Chemistry and Physics.* 1995, vol. 196, no. 6, p. 1963-1970. However, a cationic polymerization method leads to hyperbranched polymer with a polydispersity larger than 3 and molecular weights can not be controlled.

A suitable procedure for the preparation of hyperbranched polyglycerols with a controlled molecular weight is disclosed in DE 19947631 A (BAYER). This is achieved by adding glycidol diluted in a hydrocarbon or an ether to a suitable polyol initiator that is dissolved in diglyme or another hydrocarbon as disclosed in SUNDER, A., et al. Controlled Synthesis of Hyperbranched Polyglycerols by Ring-Opening Multibranching Polymerization. *Macromolecules.* 1999, vol. 92, no. 13, p. 4240-4246. The monomer is added as solution containing between 20 and 99.9 wt %, e.g., 60%-90% THF. Full incorporation of an initiator is promoted by the use of a polyfunctional initiator.

Photoreactive Polymers

The photoreactive polymer according to the present invention comprises a dendritic polymer core with at least one initiating functional group and at least one co-initiating functional group.

In a first embodiment, the photoreactive polymer according to the present invention a dendritic polymeric core derivatized with at least one photoinitiator or derivative thereof and at least one co-initiator or derivative thereof.

In a second embodiment, the co-initiator may be part of the dendritic polymeric core, which is only derivatized with a photoinitiator or derivative thereof.

The photoreactive polymer may be further derivatized with other functional groups such as a compatibilizing moiety. For example, the compatibilizing moiety may introduce ionic groups onto the dendritic polymer core so that photoreactive polymer can be easily dissolved in water or an aqueous solution such as a water based radiation curable ink-jet ink.

The photoreactive polymers have preferably at least three co-initiating functional groups on the dendritic polymer core, more preferably at least five co-initiating functional groups on the dendritic polymer core, and most preferably at least seven co-initiating functional groups on the dendritic polymer core.

The photoreactive polymers have preferably at least three initiating functional groups on the dendritic polymer core, more preferably at least five initiating functional groups on the dendritic polymer core, and most preferably at least seven initiating functional groups on the dendritic polymer core.

Any photo-initiating moiety known in the prior art can be used in the present invention. The photo-initiating moiety for the photoreactive polymer according to the present invention is preferably selected from the group consisting of a Norrish type I-initiator, a Norrish type II-initiator and a photoacid. More preferably, the photo-initiating moiety is a Norrish type II-photoinitiator.

A preferred Norrish type II-initiator is selected from the group consisting of benzophenones, thioxanthones, 1,2-diketones and anthraquinones.

Suitable Norrish type II-initiators are disclosed in CRIVELLO, J. V., et al. VOLUME III: Photoinitiators for Free Radical Cationic & Anionic Photopolymerization. 2ndth edition. Edited by BRADLEY, G. London, UK: John Wiley and Sons Ltd, 1998. p. 287-294.

Suitable examples of photo-initiating moieties capable of reacting with a dendritic polymer core are given in Table 2 without being limited thereto.

TABLE 2

| INI-1 | 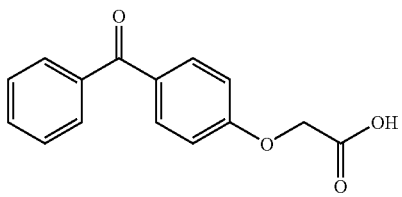 |
| INI-2 | 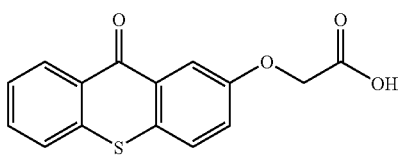 |
| INI-3 | 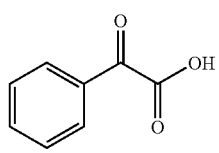 |
| INI-4 | 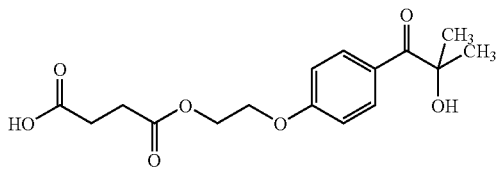 |

TABLE 2-continued

| INI-5 | 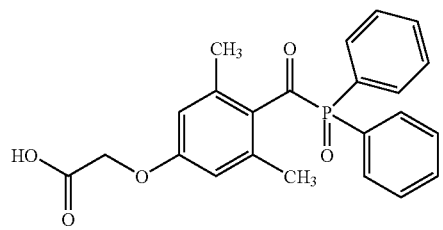 |
| INI-6 | 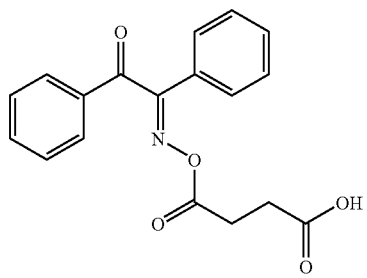 |
| INI-7 | 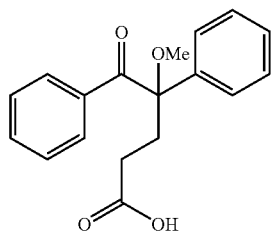 |
| INI-8 | 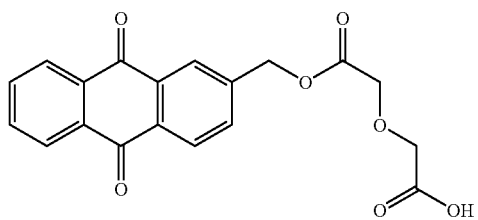 |
| INI-9 | 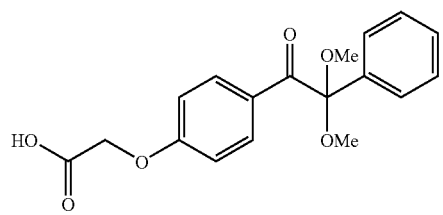 |
| INI-10 | 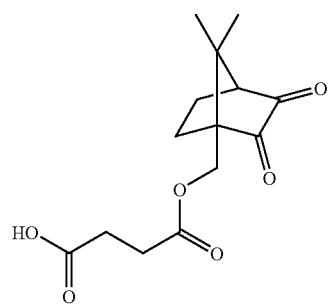 |

TABLE 2-continued

INI-11
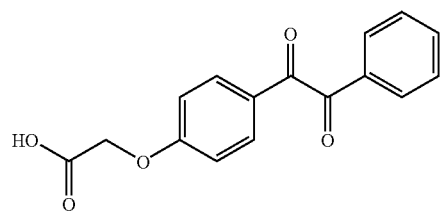

INI-12
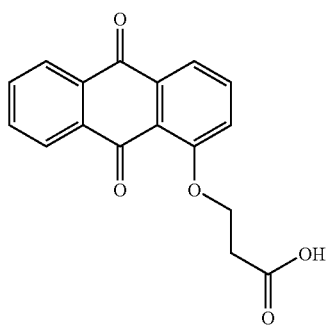

INI-13
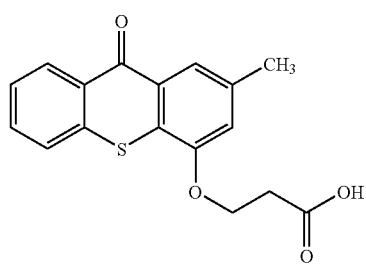

INI-14
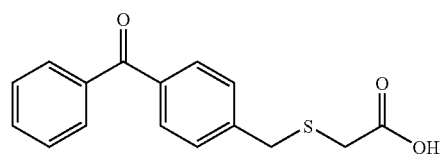

Any co-initiating moiety known in the prior art can be used to derivatize the dendritic polymeric core. In a more preferred embodiment, the co-initiating moiety is selected from the group consisting of an aliphatic amine, an aromatic amine and a thiol. In an even more preferred embodiment, the co-initiating moiety is selected from the group consisting of a tertiary amine, a 4-dialkylaminobezoic acid derivative and a heterocyclic thiol.

Suitable examples of co-initiating moieties capable of reacting with a dendritic polymeric core are given in Table 3, without being limited thereto.

TABLE 3

SYN-1
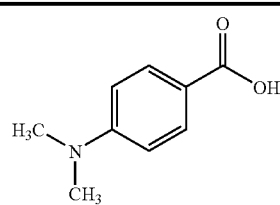

TABLE 3-continued

SYN-2
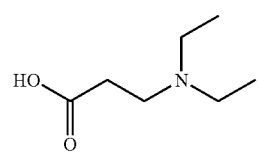

SYN-3
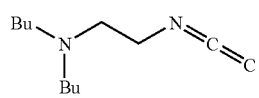

SYN-4
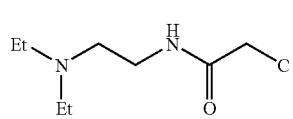

SYN-5
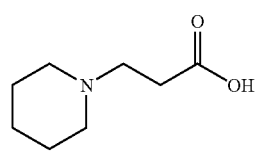

SYN-6
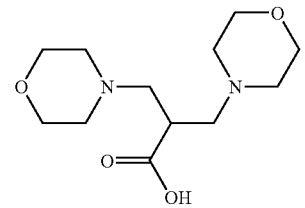

SYN-7
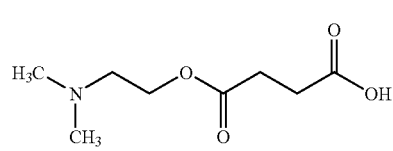

SYN-8
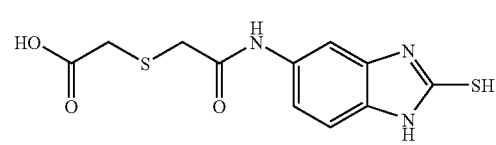

SYN-9
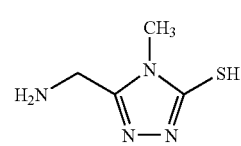

SYN-10
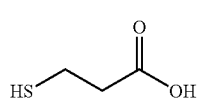

TABLE 3-continued

SYN-11: [structure: 4-(N-methyl-N-carboxymethylamino)benzoic acid ethyl ester]

SYN-12: [structure: 1-methylpyrrolidine-2-carboxylic acid]

SYN-13: [structure: N-(2-hydroxyethyl)-N-(2-hydroxyethyl)ethylenediamine]

SYN-14: [structure: 2-bromoethyl 4-(dimethylamino)benzoate]

SYN-15: [structure: 3-morpholino-dihydrofuran-2,5-dione]

SYN-16: [structure: 3-(4-methyl-5-mercapto-4H-1,2,4-triazol-3-yl)propanoic acid]

The dendritic polymer core can be fully or partially derivatized.

It is evident for those skilled in the art that many types of derivatization chemistry can be used to derivatize the dendritic polymeric core with photo-initiating moieties and the co-initiating moieties. In the case of hyperbranched polyglycidols, esterification and etherification are particularly preferred.

In a preferred embodiment, the photoreactive polymers are further derivatized with a compatibilizing group. A compatibilizing group is defined as a functional group making the photoreactive polymer more soluble in a specific radiation curable composition.

Suitable examples of compatibilizing groups are given in Table 4, without being limited thereto.

TABLE 4

Compatibilizer R—COOH

C-1: [structure: 2,2-dimethylpropanoic acid / pivalic acid]

C-2: [structure: 3-methoxypropanoic acid]

C-3: [structure: 3-(2-methoxyethoxy)propanoic acid]

C-4: [structure: 2-methoxypropanoic acid]

C-5: [structure: succinic acid]

C-6: [structure: 2-ethylhexanoic acid]

C-7: [structure: 2-sulfobenzoic acid sodium salt]

C-8: [structure: 2-(2,4-di-tert-pentylphenoxy)acetic acid]

TABLE 4-continued

| Compatibilizer R—COOH | |
|---|---|
| C-9 | (structure: 2-sulfobenzoic acid — benzene ring with COOH (OH) and SO₃H) |
| C-10 | HOOC-CH₂-O-CH₂CH₂-O-CH₂CH₂-O-CH₃ |

Suitable examples of photoreactive polymers according to the first embodiment are given below, without being limited thereto. The structures given represent one molecular weight with one degree of derivatization out of the distribution found in each prepared sample. The structures represent a more generic structure, as a specific example for different molecular weights and degrees of substitution. It is obvious for those skilled in the art that each polymer sample is a mixture of similar individual compounds, differing in both molecular weight and degree of substitution and that the chemistry can be extended over a wide range of molecular weights.

Suitable photoreactive polymers according to the present invention, having a hyperbranched polyester core are disclosed in Table 5. Structure of a hyperbrached polyester core:

TABLE 5

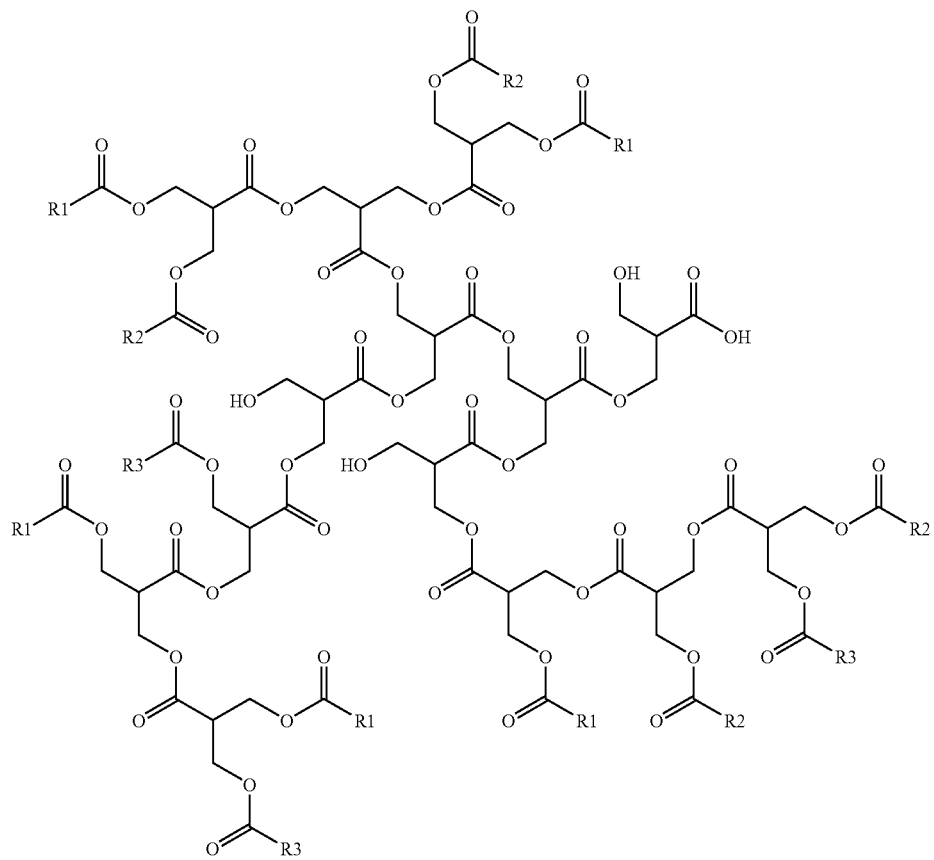

| Photoreactive Polymer | Initiator moiety R1—COOH | Co-initiator moiety R2—COOH | Compatibilizer R3—COOH |
|---|---|---|---|
| PES-1 | INI-1 | SYN-1 | C-10 |
| PES-2 | INI-2 | SYN-5 | C-1 |
| PES-3 | INI-11 | SYN-2 | C-6 |
| PES-4 | INI-3 | SYN-10 | C-9 |
| PES-5 | INI-6 | SYN-16 | C-10 |
| PES-6 | INI-4 | SYN-1 | C-3 |
| PES-7 | INI-5 | SYN-2 | C-6 |
| PES-8 | INI-10 | SYN-1 | C-5 |

Suitable photoreactive polymers according to the present invention, have a hyperbranched polyester-amine core are disclosed in Table 6. Structure of a hyperbranched polyester-amine core:

TABLE 6

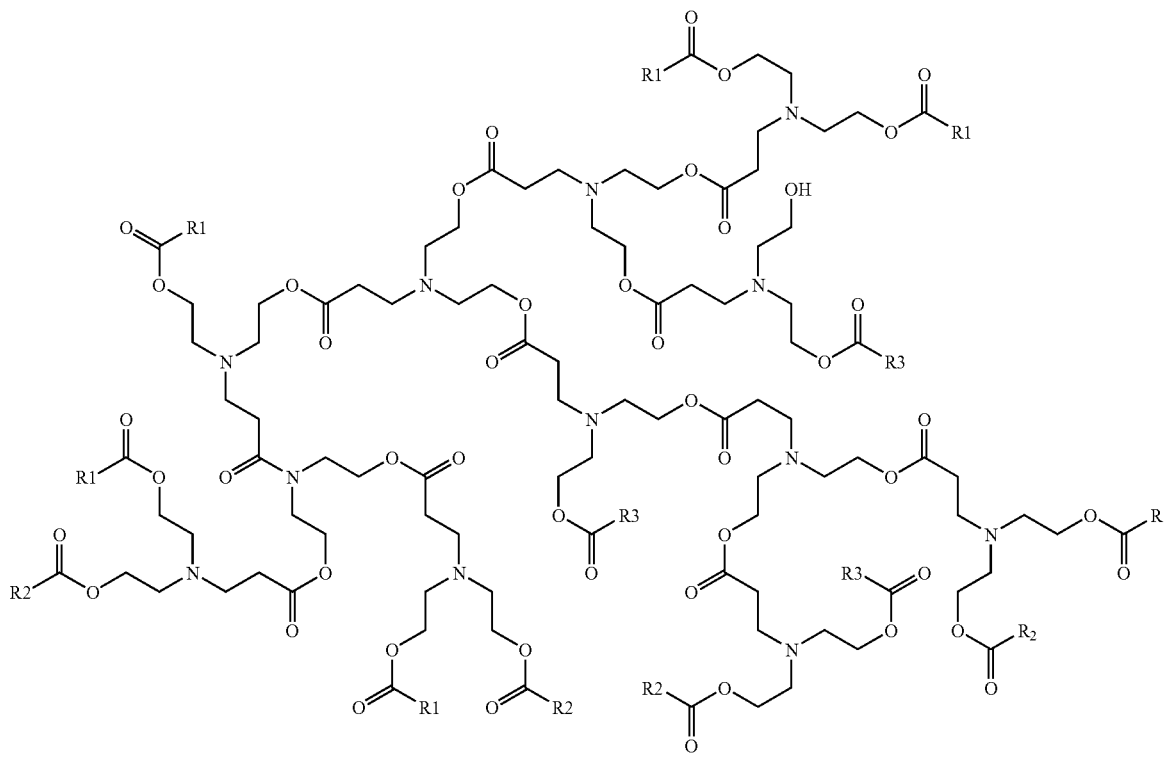

| Photoreactive polymer | Initiator moiety R1—COOH | Co-initiator moiety R2—COOH | Compatibilizer R3—COOH |
| --- | --- | --- | --- |
| PESA-1 | INI-1 | SYN-1 | C-10 |
| PESA-2 | INI-3 | SYN-5 | C-1 |
| PESA-3 | INI-10 | SYN-2 | C-10 |
| PESA-4 | INI-5 | SYN-5 | C-10 |
| PESA-5 | INI-11 | SYN-1 | C-6 |
| PESA-6 | INI-4 | SYN-2 | C-6 |
| PESA-7 | INI-1 | SYN-12 | C-3 |
| PESA-8 | INI-12 | SYN-1 | C-3 |

Suitable photoreactive polymers according to the present invention, have a hyperbranched polyether core are disclosed in Table 7. Structure of a hyperbranched polyether core:

TABLE 7

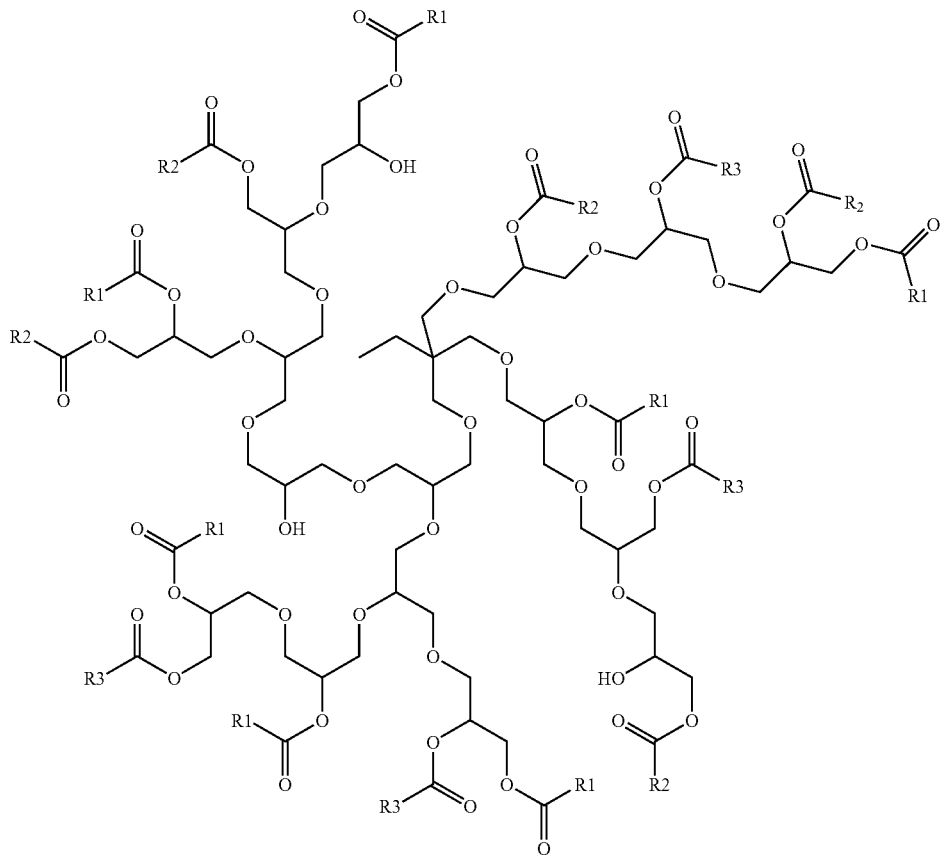

| Photoreactive polymer | Initiator moiety R1—COOH | Co-initiator moiety R2—COOH | Compatibilizer R3—COOH |
|---|---|---|---|
| PE-1 | INI-1 | SYN-5 | C-10 |
| PE-2 | INI-2 | SYN-1 | C-10 |
| PE-3 | INI-2 | SYN-5 | C-10 |
| PE-4 | INI-1 | SYN-1 | C-10 |
| PE-5 | INI-12 | SYN-2 | C-1 |
| PE-6 | INI-10 | SYN-10 | C-6 |
| PE-7 | INI-3 | SYN-2 | C-3 |
| PE-8 | INI-4 | SYN-5 | C-9 |
| PE-9 | INI-13 | SYN-10 | C-6 |
| PE-10 | INI-14 | SYN-1 | C-1 |

In a second embodiment of the present invention, the co-initiator is part of the hyperbranched polymeric core and the end groups are derivatized with a photo-initiator or derivative thereof. The hyperbranched polymeric core can be both a regular hyperbranched polymer such as a dendrimer or a random hyperbranched polymer.

Suitable examples of photoreactive polymers according to the present invention, having a dendritic polymeric core of a dendrimer or a dendritic polymeric core of a hyperbranched polymer are given below, without being limited thereto.

Photoreactive polymers according to the second embodiment having a dendritic polymeric core of a dendrimer are disclosed in Table 8. Structure of a dendritic polymeric core of a dendrimer:

TABLE 8

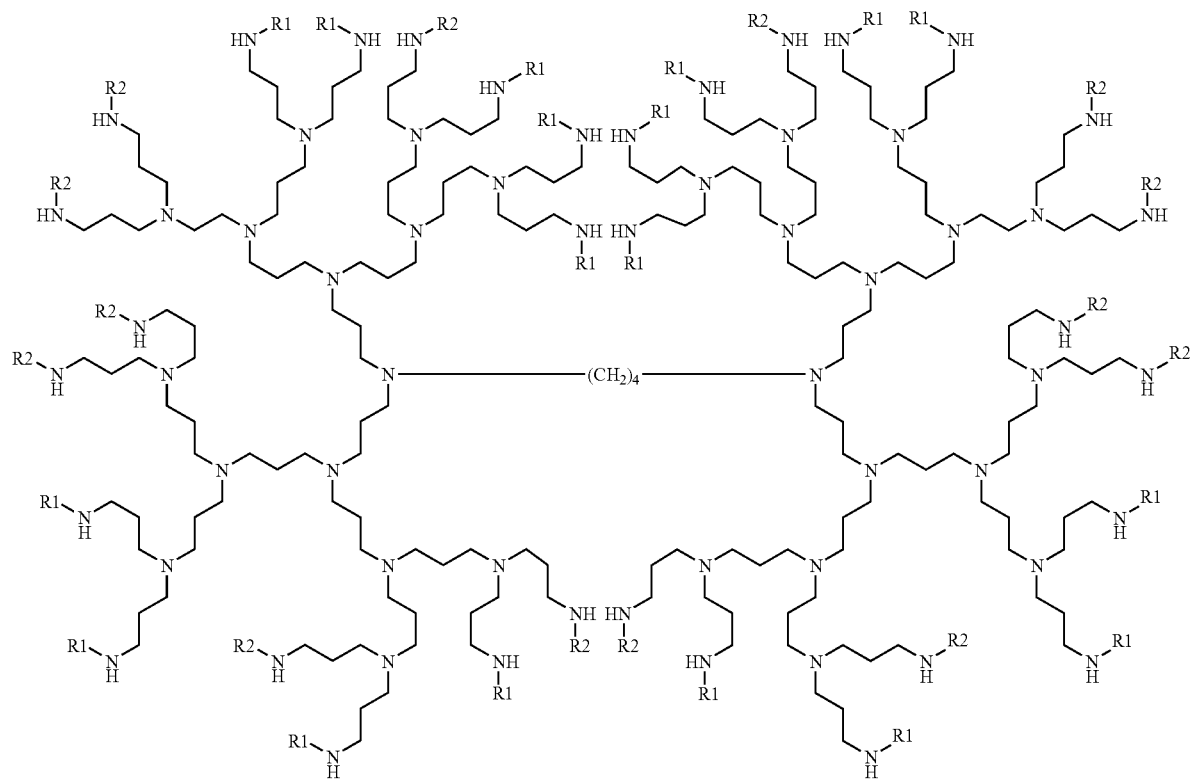

| Photoreactive polymer | Initiator moiety R1—COOH | Compatibilizer R2—COOH |
|---|---|---|
| DENDRI-1 | INI-1 | C-10 |
| DENDRI-2 | INI-2 | C-6 |
| DENDRI-3 | INI-10 | C-1 |

Photoreactive polymers according to the second embodiment having a dendritic polymeric core of a hyperbranched polymer are disclosed in Table 9. Structure of a dendritic polymeric core of a hyperbranched polymer:

The radiation-curable compound can be selected from monomers and/or oligomers that can be polymerized by a curing means of an ink-jet printer.

TABLE 9

[Chemical structure of dendritic hyperbranched polymer]

| Photoreactive polymer | Initiator moiety R1—COOH | Compatibilizer R2—COOH |
|---|---|---|
| AM-1 | INI-1 | C-10 |
| AM-2 | INI-2 | C-6 |
| AM-3 | INI-10 | C-1 |

Radiation Curable Composition

The photoreactive polymer according to the present invention can be used in any radiation curable composition such as a varnish, a lacquer, and a printing ink, but is especially useful in radiation curable ink-jet inks.

The radiation curable ink-jet ink is preferably jetted on an ink-jet recording element chosen from the group consisting of paper, coated paper, polyolefin coated paper, cardboard, wood, composite boards, plastic, coated plastic, canvas, textile, metal, glasses, plant fibre products, leather, magnetic materials and ceramics.

The radiation curable ink-jet ink jetted on an ink-jet recording element creates an uncured printed image. This printed image is cured by radiation or electron beam exposure. A preferred means of radiation curing is ultraviolet light.

Radiation-Curable Ink-Jet Ink

A radiation-curable ink-jet ink contains at least three components: (i) a radiation-curable compound, (ii) a colorant (i.e. pigment or dye) and (iii) a photoreactive polymer according to the present invention. A preferred amount of the photoreactive polymer is 1-50 wt % of the total ink weight, and more preferably 1 to 25 wt % of the total ink weight.

The radiation-curable ink-jet ink may contain a polymerization inhibitor to restrain polymerization by heat or actinic radiation. It is preferred to add an inhibitor during preparation of the ink-jet ink.

The radiation-curable ink-jet ink may further contain at least one resin in order to obtain a stable dispersion of the colorant in the ink-jet ink.

The radiation-curable ink-jet ink preferably further contains at least one surfactant.

The radiation-curable ink-jet ink preferably further contains at least one solvent.

The radiation-curable ink-jet ink preferably further contains at least one biocide.

An ink-jet printer generally uses a radiation-curable ink-jet ink set consisting of a plurality of radiation-curable ink-jet inks.

Radiation-Curable Compounds

The radiation curable ink-jet ink contains monomers and/or oligomers, which are polymerized by the curing means of the ink-jet printer. Monomers, oligomers or prepolymers may possess different degrees of functionality, and a mixture including combinations of mono-, di-, tri-and higher functionality monomers, oligomers and/or prepolymers may be used. These components are curable, typically photo-curable, e.g. UV curable, and should adhere to the ink-receiver surface after printing and serve to bind the colorant. A mixture of two or more monomers of the same functionality is preferred, with particularly preferred a mixture of two di-functional monomers.

The viscosity of the radiation curable ink-jet ink can be adjusted by varying the ratio between the monomers and oligomers.

Any method of conventional radical polymerization, photo-curing system using photo acid or photo base generator, or photo induction alternating copolymerization may be employed. In general, radical polymerization and cationic polymerization are preferred, and photo induction alternating copolymerization needing no initiator may also be employed. Furthermore, a hybrid system of combinations of these systems is also effective.

Cationic polymerization is superior in effectiveness due to lack of inhibition of the polymerization by oxygen, however it is slow and expensive. If cationic polymerization is used, it is preferred to use an epoxy compound together with an oxetane compound to increase the rate of polymerization. Radical polymerization is the preferred polymerization process.

Any polymerizable compound commonly known in the art may be employed. Particularly preferred for use as a radiation-curable compound in the radiation curable ink-jet ink, are monofunctional and/or polyfunctional acrylate monomers, oligomers or prepolymers, such as isoamyl acrylate, stearyl acrylate, lauryl acrylate, octyl acrylate, decyl acrylate, isoamylstyl acrylate, isostearyl acrylate, 2-ethylhexyl-diglycol acrylate, 2-hydroxybutyl acrylate, 2-acryloyloxyethyl-hexahydrophthalic acid, butoxyethyl acrylate, ethoxydiethylene glycol acrylate, methoxydiethylene glycol acrylate, methoxypolyethylene glycol acrylate, methoxypropylene glycol acrylate, phenoxyethyl acrylate, tetrahydrofurfuryl acrylate, isobornyl acrylate, 2-hydroxyethyl acrylate, 2-hydroxypropyl acrylate, 2-hydroxy-3-phenoxypropyl acrylate, vinyl ether acrylates such as described in U.S. Pat. No. 6,310,115 (AGFA), 2-(vinyloxy)ethylacrylate, 2-acryloyloxyethyl-succinic acid, 2-acryloyxyethylphthalic acid, 2-acryloxyethyl-2-hydroxyethyl-phthalic acid, lactone modified flexible acrylate, and t-butylcyclohexyl acrylate, triethylene glycol diacrylate, tetraethylene glycol diacrylate, polyethylene glycol diacrylate, dipropylene glycol diacrylate, tripropylene glycol diacrylate, polypropylene glycol diacrylate, 1,4butanediol diacrylate, 1,6hexanediol diacrylate, 1,9nonanediol diacrylate, neopentyl glycol diacrylate, dimethylol-tricyclodecane diacrylate, bisphenol A EO (ethylene oxide) adduct diacrylate, bisphenol A PO (propylene oxide) adduct diacrylate, hydroxypivalate neopentyl glycol diacrylate, propoxylated neopentyl glycol diacrylate, alkoxylated dimethyloltricyclodecane diacrylate and polytetramethylene glycol diacrylate, trimethylolpropane triacrylate, EO modified trimethylolpropane triacrylate, tri (propylene glycol) triacrylate, caprolactone modified trimethylolpropane triacrylate, pentaerythritol triacrylate, pentaerithritol tetraacrylate, pentaerythritolethoxy tetraacrylate, dipentaerythritol hexaacrylate, ditrimethylolpropane tetraacrylate, glycerinpropoxy triacrylate, caprolactam modified dipentaerythritol hexaacrylate, N-vinylamide such as N-vinylcaprolactam or N-vinylformamide; or acrylamide or a substituted acrylamide such as acryloylmorpholine; and amino functionalized polyetheracrylates such as described in U.S. Pat. No. 6,300,388 (AGFA).

Furthermore, methacrylates corresponding to the above-mentioned acrylates may be used with these acrylates. Of the methacrylates, methoxypolyethylene glycol methacrylate, methoxytriethylene glycol methacrylate, 4-(vinyloxy)butyl-methacrylate, vinyl ether acrylates such as described in U.S. Pat. No. 6,310,115 (AGFA), hydroxyethyl methacrylate, phenoxyethyl methacrylate, cyclohexyl methacrylate, tetraethylene glycol dimethacrylate, and polyethylene glycol dimethacrylate are preferred due to their relatively high sensitivity and higher adhesion to an ink-receiver surface.

Furthermore, the ink-jet inks may also contain polymerizable oligomers. Examples of these polymerizable oligomers include epoxy acrylates, aliphatic urethane acrylates, aromatic urethane acrylates, polyester acrylates, and straight-chained acrylic oligomers.

Colorants

Colorants may be dyes, but are preferably pigments or a combination thereof. Organic and/or inorganic pigments may be used.

The pigment particles should be sufficiently small to permit free flow of the ink through the ink-jet printing device, especially at the ejecting nozzles which usually have a diameter ranging from 10 μm to 50 μm. The particle size influences also the pigment dispersion stability. It is also desirable to use small particles for maximum colour strength. The particles of the pigment dispersed in the ink-jet ink should have a particle size of less than 10 μm, preferably less than 3 μm, and most preferably less than 1 μm. The average particle size of pigment particles is preferably 0.05 to 0.5 μm.

Suitable pigments include as red or magenta pigments: Pigment Red 3, 5, 19, 22, 31, 38, 43, 48: 1, 48: 2, 48: 3, 48: 4, 48: 5, 49: 1, 53: 1, 57: 1, 57: 2, 58: 4, 63: 1, 81, 81: 1, 81: 2, 81: 3, 81: 4, 88, 104, 108, 112, 122, 123, 144, 146, 149, 166, 168, 169, 170, 177, 178, 179, 184, 185, 208, 216, 226, 257, Pigment Violet 3, 19, 23, 29, 30, 37, 50, and 88; as blue or cyan pigments: Pigment Blue 1, 15, 15: 1, 15: 2, 15: 3, 15: 4, 15: 6, 16, 17-1, 22, 27, 28, 29, 36, and 60; as green pigments: Pigment green 7, 26, 36, and 50; as yellow pigments: Pigment Yellow 1, 3, 12, 13, 14, 17, 34, 35, 37, 55, 74, 81, 83, 93, 94, 95, 97, 108, 109, 110, 128, 137, 138, 139, 153, 154, 155, 157, 166, 167, 168, 177, 180, 185, and 193; as white pigment: Pigment White 6, 18, and 21.

Furthermore, the pigment may be chosen from those disclosed by HERBST, W, et al. Industrial Organic Pigments, Production, Properties, Applications. 2nd edition. VCH, 1997.

Most preferred pigments are Pigment Yellow 1, 3, 128, 109, 93, 17, 14, 10, 12, 13, 83, 65, 75, 74, 73, 138, 139, 154, 151, 180, 185; Pigment Red 122, 22, 23, 17, 210, 170, 188, 185, 146, 144, 176, 57:1, 184, 202, 206, 207; Pigment Blue 15:3, Pigment Blue 15:2, Pigment Blue 15:1, Pigment Blue 15:4, Pigment Blue 15:6, Pigment Blue 16 and Pigment Violet 19.

Carbon black is usually used as the colouring material in black ink. Suitable black pigment materials include carbon blacks such as Pigment Black 7 (e.g. Carbon Black MA8™ from MITSUBISHI CHEMICAL), Regal™ 400R, Mogul™ L, Elftex™ 320 from CABOT Co., or Carbon Black FW18, Special Black 250, Special Black 350, Special Black 550, Printex™ 25, Printex™ 35, Printex™ 55, Printex™ 90, Printex™ 150T from DEGUSSA.

Additional examples of suitable pigments are disclosed in U.S. Pat. No. 5,389,133 (XEROX).

The pigment is present in the range of 0.1 to 10 wt %, preferably in the range 1 to 5 wt % based on the total weight of the radiation curable ink-jet ink.

Dyes suitable for the radiation curable ink-jet ink include direct dyes, acidic dyes, basic dyes and reactive dyes.

Suitable direct dyes for the radiation curable ink-jet ink include:

C.I. Direct Yellow 1, 4, 8, 11, 12, 24, 26, 27, 28, 33, 39, 44, 50, 58, 85, 86, 100, 110, 120, 132, 142, and 144

C.I. Direct Red 1, 2, 4, 9, 11, 134, 17, 20, 23, 24, 28, 31, 33, 37, 39, 44, 47, 48, 51, 62, 63, 75, 79, 80, 81, 83, 89, 90, 94, 95, 99, 220, 224, 227 and 343

C.I. Direct Blue 1, 2, 6, 8, 15, 22, 25, 71, 76, 78, 80, 86, 87, 90, 98, 106, 108, 120, 123, 163, 165, 192, 193, 194, 195, 196, 199, 200, 201, 202, 203, 207, 236, and 237

C.I. Direct Black 2, 3, 7, 17, 19, 22, 32, 38, 51, 56, 62, 71, 74, 75, 77, 105, 108, 112, 117, and 154

Suitable acidic dyes for the radiation curable ink-jet ink include:

C.I. Acid Yellow 2, 3, 7, 17, 19, 23, 25, 20, 38, 42, 49, 59, 61, 72, and 99

C.I. Acid Orange 56 and 64

C.I. Acid Red 1, 8, 14, 18, 26, 32, 37, 42, 52, 57, 72, 74, 80, 87, 115, 119, 131, 133, 134, 143, 154, 186, 249, 254, and 256

C.I. Acid Violet 11, 34, and 75

C.I. Acid Blue 1, 7, 9, 29, 87, 126, 138, 171, 175, 183, 234, 236, and 249

C.I. Acid Green 9, 12, 19, 27, and 41

C.I. Acid Black 1, 2, 7, 24, 26, 48, 52, 58, 60, 94, 107, 109, 110, 119, 131, and 155

Suitable reactive dyes for the radiation curable ink-jet ink include:

C.I. Reactive Yellow 1, 2, 3, 14, 15, 17, 37, 42, 76, 95, 168, and 175

C.I. Reactive Red 2, 6, 11, 21, 22, 23, 24, 33, 45, 111, 112, 114, 180, 218, 226, 228, and 235

C.I. Reactive Blue 7, 14, 15, 18, 19, 21, 25, 38, 49, 72, 77, 176, 203, 220, 230, and 235

C.I. Reactive Orange 5, 12, 13, 35, and 95

C.I. Reactive Brown 7, 11, 33, 37, and 46

C.I. Reactive Green 8 and 19

C.I. Reactive Violet 2, 4, 6, 8, 21, 22, and 25

C.I. Reactive Black 5, 8, 31, and 39

Suitable basic dyes for the radiation curable ink-jet ink include:

C.I. Basic Yellow 11, 14, 21, and 32

C.I. Basic Red 1, 2, 9, 12, and 13

C.I. Basic Violet 3, 7, and 14

C.I. Basic Blue 3, 9, 24, and 25

Dyes can only manifest the ideal colour in an appropriate range of pH value. Therefore, the radiation curable ink-jet ink preferably further comprises a pH buffer, such as potassium hydroxide (KOH).

Inhibitors

Suitable polymerization inhibitors include phenol type antioxidants, hindered amine light stabilizers, phosphor type antioxidants, hydroquinone monomethyl ether commonly used in (meth)acrylate monomers, and hydroquinone, t-butylcatechol, pyrogallol may also be used. Of these, a phenol compound having a double bond in molecules derived from acrylic acid is particularly preferred due to its having a polymerization-restraining effect even when heated in a closed, oxygen-free environment. Suitable inhibitors are, for example, Sumilizer™ GA-80, Sumilizer™ GM and Sumilizer™ GS produced by Sumitomo Chemical Co., Ltd; Genorad™ 16 available from RAHN.

Since excessive addition of these polymerization inhibitors will lower the ink sensitivity to curing, it is preferred that the amount capable of preventing polymerization be determined prior to blending. The amount of a polymerization inhibitor is generally between 200 and 20,000 ppm of the total ink weight.

Resins

The radiation curable ink-jet ink may further contain a resin, also called a pigment stabilizer or dispersant, in order to obtain a stable dispersion of the pigment(s) in the ink-jet ink.

The pigments may be added to the radiation curable ink-jet ink as a dispersion comprising a dispersant.

Suitable resins: petroleum type resins (e.g., styrene type, acryl type, polyester, polyurethane type, phenol type, butyral type, cellulose type, and rosin); and thermoplastic resins (e.g., vinyl chloride, vinylacetate type). Concrete examples of these resins include acrylate copolymers, styrene-acrylate copolymers, acetalized and incompletely saponified polyvinyl alcohol, and vinylacetate copolymers. Commercial resins are known under the tradenames Solsperse™ 32000 and Solsperse™ 39000 available from AVECIA, EFKA™ 4046 available from EFKA CHEMICALS BV, Disperbyk™ 168 available from BYK CHEMIE GMBH.

A detailed list of non-polymeric as well as some polymeric dispersants is disclosed by MC CUTCHEON. Functional Materials, North American Edition. Glen Rock, N.J.: Manufacturing Confectioner Publishing Co., 1990. p. 110-129.

Typically resins are incorporated at 2.5% to 200%, more preferably at 50% to 150% by weight of the pigment.

Surfactants

The radiation curable ink-jet ink may contain at least one surfactant. The surfactant(s) can be anionic, cationic, non-ionic, or zwitter-ionic and are usually added in a total quantity below 20 wt % based on the total ink weight and particularly in a total below 10 wt % based on the total ink weight.

A fluorinated or silicone compound may be used as a surfactant, however, a potential drawback is extraction by food from ink-jet food packaging material because the surfactant does not cross-link. It is therefore preferred to use a copolymerizable monomer having surface-active effects, for example, silicone-modified acrylates, silicone modified methacrylates, fluorinated acrylates, and fluorinated methacrylates.

Solvents

The radiation curable ink-jet ink may contain as a solvent, water and/or organic solvents, such as alcohols, fluorinated solvents and dipolar aprotic solvents, the solvent preferably being present in a concentration between 10 and 80 wt %, particularly preferably between 20 and 50 wt %, each based on the total weight of the radiation curable ink-jet ink.

However, the radiation curable ink-jet ink preferably does not contain an evaporable component, but sometimes, it can be advantageous to incorporate an extremely small amount of an organic solvent in such inks to improve adhesion to the ink-receiver surface after UV curing. In this case, the added solvent can be any amount in the range which does not cause problems of solvent resistance and VOC, and preferably 0.1-5.0 wt %, and particularly preferably 0.1-3.0 wt %, each based on the total weight of the radiation curable ink-jet ink Suitable organic solvents include alcohol, aromatic hydrocarbons, ketones, esters, aliphatic hydrocarbons, higher fatty acids, carbitols, cellosolves, higher fatty acid esters. Suitable alcohols include, methanol, ethanol, propanol and 1-butanol, 1-pentanol, 2-butanol, t.-butanol. Suitable aromatic hydrocarbons include toluene, and xylene. Suitable ketones include methyl ethyl ketone, methyl isobutyl ketone, 2,4-pentanedione and hexafluoroacetone. Also glycol, glycolethers, N-methylpyrrolidone, N,N-dimethylacetamid, N,N-dimethylformamid may be used.

Biocides

Suitable biocides for the radiation curable ink-jet ink include sodium dehydroacetate, 2-phenoxyethanol, sodium benzoate, sodium pyridinethion-1-oxide, ethyl p-hydroxybenzoate and 1,2-benzisothiazolin-3-one and salts thereof. A preferred biocide for radiation curable ink-jet ink is Proxel™ GXL available from ZENECA COLOURS.

A biocide is preferably added in an amount of 0.001 to 3 wt %, more preferably 0.01 to 1.00 wt. %, each based on the radiation curable ink-jet ink.

Preparation of a Radiation Curable Ink-Jet Ink

A dispersion of colorant for use in the radiation curable ink-jet ink may be prepared by mixing, milling and dispersion of colorant and resin. Mixing apparatuses may include a pressure kneader, an open kneader, a planetary mixer, a dissolver, and a Dalton Universal Mixer. Suitable milling and dispersion apparatuses are a colloid mill, a high-speed disperser, double rollers, a bead mill, a paint conditioner, and triple rollers. The dispersions may also be prepared using ultrasonic energy.

In the process of mixing, milling and dispersion, each process is performed with cooling to prevent build up of heat, and as much as possible under light conditions in which UV-light has been substantially excluded.

The radiation curable ink-jet ink may be prepared using separate dispersions for each colorant, or alternatively several pigments may be mixed and co-milled in preparing the dispersion.

EXAMPLES

The present invention will now be described in detail by way of Examples hereinafter.

Measurement Methods

1. Curing Speed

The percentage of the maximum output of the lamp was taken as a measure for curing speed, the lower the number the higher curing speed. A sample was considered as fully cured at the moment scratching with a Q-tip caused no visual damage.

2. Viscosity

The viscosity of the radiation curable composition was measured with a Brookfield DV-II+ viscometer at 25° C. and shear rate 3 RPM.

Materials

All materials used in the following examples were readily available from Aldrich Chemical Co. (Belgium) unless otherwise specified. The "water" used in the examples was deionized water. The following materials were used:

DPGDA™ is a difunctional acrylate monomer available from UCB.

Sartomer™ SR351 is a trifunctional acrylate monomer available from BASF.

Quantacure™ EHA available from RAHN AG.

The hyperbranched polyglycidols $PG_{17}$, $PG_{33}$, $PG_{83}$ and $PG_{179}$ are available from HYPERPOLYMERS GMBH, Freiburg, Germany Boltorn™ H20 available from PERSTORP.

PET is the abbreviation for poly(ethylene) terephthalate. Unsubbed PET substrate with on the backside an anti-blocking layer with anti-static properties is available from AGFA-GEVAERT as P125C PLAIN/ABAS.

Example 1

This example illustrates the synthesis of a hyperbranched polyglycidol core derivatized with benzophenone and piperidine.

The photoreactive polymers IS-1 to IS-4 were prepared and can be represented by generalized formula IS-A.

Generalized Formula IS-A:

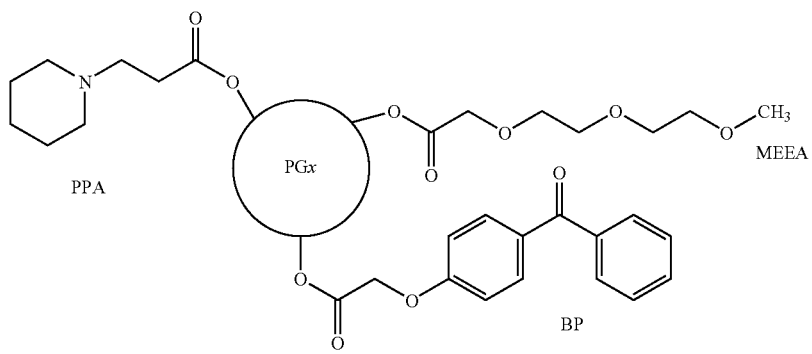

wherein,

PG represents a hyperbranched polyglycidol core x represents the average number of terminal hydroxyl groups in the starting polyglycidol The hyperbranched polyglycidols selected for this example had different molecular weights:

$PG_{17}$: a hyperbranched polyglycidol with 17 hydroxyl groups on average;

$PG_{33}$: a hyperbranched polyglycidol with 33 hydroxyl groups on average;

$PG_{83}$: a hyperbranched polyglycidol with 83 hydroxyl groups on average; and $PG_{179}$: a hyperbranched polyglycidol with 179 hydroxyl groups on average.

The synthesis of IS-1 to IS-4 can be represented by the following reaction scheme:

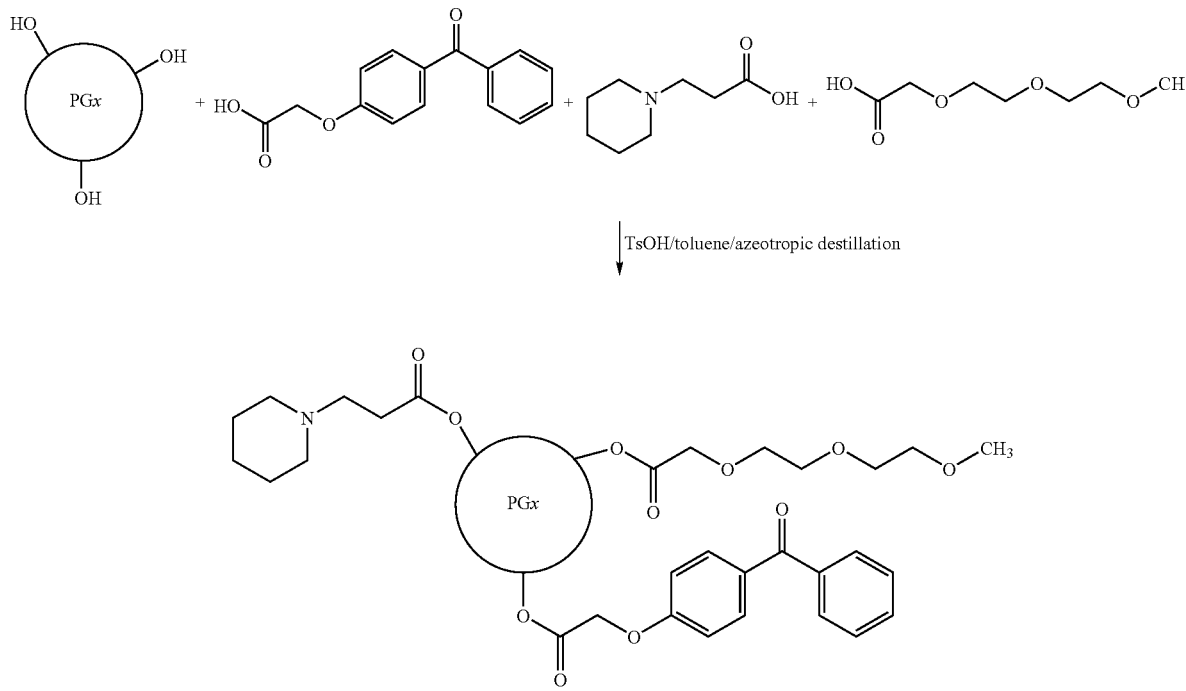

The photoreactive polymers IS-1 to IS-4 were prepared according to Table 10, which mentions the ratio of the different groups acylated onto each starting polyglycidol.

TABLE 10

| Photoreactive polymer | x | PPA | MEEA | BP | General formula |
|---|---|---|---|---|---|
| IS-1 | 17 | 4.6 | 8.1 | 4.3 | $PG_{17}BP_{4.3}PPA_{4.6}MEEA_{8.1}$ |
| IS-2 | 33 | 8.9 | 15.1 | 8.2 | $PG_{33}BP_{8.2}PPA_{8.9}MEEA_{15.9}$ |
| IS-3 | 83 | 24.8 | 35.5 | 22.7 | $PG_{83}BP_{22.7}PPA_{24.8}MEEA_{35.5}$ |
| IS-4 | 179 | 56.7 | 73.2 | 49.0 | $PG_{179}BP_{49}PPA_{56.7}MEEA_{73.2}$ |

The synthesis is exemplified for the polymer, $PG_{17}BP_{4.3}PPA_{4.6}MEEA_{8.1}$: 2.05 g (1.69 mmol) of $PG_{17}$ ($M_n=1214$ g/mol$^{-1}$, $M_w/M_n=1.6$), 2.21 g (8.57 mmol) of p-benzophenoxyacetic acid (BP), 1.35 g (8.57 mmol) of 1-piperidinepropionic acid (PPA), 1.77 ml (11.4 mmol) of 2-[2-(2-methoxyethoxy)ethoxy]acetic acid (MEEA) and 2.18 g (11.4 mmol) of p-toluenesulfonic acid monohydrate were added into a 100 ml one-neck flask equipped with Dean-Stark and condenser. Then 40 ml of toluene was added. The mixture was heated to 136° C. for 2 h, while water was removed azeotropically. Then 0.88 ml (5.7 mmol) of extra MEEA was added. The mixture was further reluxed for additional 4 h. After removing the solvent under reduced pressure, the residue was dissolved in chloroform. The mixture was washed twice with 10% of NaOH aq and several times with NaCl aq until pH=7. After removing the solvent under reduced pressure, the residual water was removed by azeotropical destination with toluene. The solution was filtered and the toluene was removed under reduced pressure. The residue was further dried at 40° C. in vacuum.

$^1$H NMR (CDCl$_3$): d=0.77, 1.32 (TMP core of PG); 1.14-1.64 (β and γ CH$_2$ in piperidine ring); 1.98 (CH$_3$COO—); 2.13-2.66 (α CH$_2$ in piperidine ring, —NCH$_2$CH$_2$COO—); 2.98-5.42 (protons of PG and MEEA moieties, —OCH$_2$COO—); 6.62-8.05 (protons of aromatic ring of BP moieties).

The synthesized photoreactive polymers displayed properties as disclosed by Table 11.

TABLE 11

| Photoreactive polymer | $M_n$ | Yield |
|---|---|---|
| IS-1 | 4176 | 86% |
| IS-2 | 7929 | 53% |
| IS-3 | 20500 | 58% |
| IS-4 | 44400 | 53% |

Example 2

This example illustrates the effectiveness of the photoreactive polymers in radiation curable compositions.

The curing efficiency of the photoreactive polymers was compared with the combination of a low molecular weight synergist and photoinitiator. The molar ratio of the synergist and photoinitiator was kept constant for both polymers and the low molecular weight comparison. The initiator had the same UV-VIS absorption spectrum as the photoreactive polymers.

The comparative radiation curable composition COMP-1 and the inventive radiation curable compositions INV-1 and INV-2 were prepared according to Table 12. The weight % (wt %) was based on the total weight of the radiation curable composition.

TABLE 12

| wt % of: | COMP-1 | INV-1 | INV-2 |
|---|---|---|---|
| DPGDA ™ | 52.5 | 42.0 | 42.0 |
| Sartomer ™ SR351 | 40.0 | 40.0 | 40.0 |
| Initiator ILM-1 | 5.0 | — | — |
| Co-initiator CLM-1 | 2.5 | — | — |
| IS-1 | — | 18.0 | — |
| IS-2 | — | — | 18.0 |

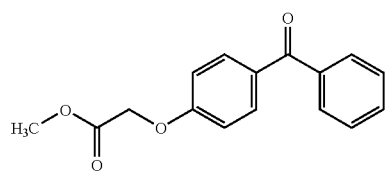

Initiator ILM-1

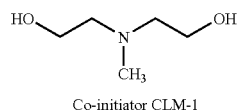

Co-initiator CLM-1

The comparative radiation curable composition and the inventive radiation curable compositions INV-1 and INV-2 were coated on an unsubbed 100 μm PET substrate using a bar coater and a 10 μm wired bar. Each coated layer was cured using a Fusion DRSE-120 conveyer, equipped with a Fusion VPS/I600 lamp (D-bulb), which transported the samples under the UV-lamp on a conveyer belt at a speed of 20 m/min. The curing speed was determined for the comparative radiation curable composition COMP-1 and the inventive radiation curable compositions INV-1 and INV-2. The results are summarized in Table 13.

TABLE 13

| Radiation curable composition | Sensitivity % of maximum output |
|---|---|
| COMP-1 | 160 |
| INV-1 | 130 |
| INV-2 | 95 |

Table 13 shows that the inventive radiation curable compositions INV-1 and INV-2 have a higher curing speed compared to the comparative radiation curable composition COMP-1 with a state of the art commercial initiator and co-initiator of low molecular weight. A percentage of more than 100% of the maximum output of the lamp means that the speed of the conveyer belt had to be reduced to get the sample fully cured at the maximum output of the lamp. The higher the percentage, the more the belt had to be slowed down. A sensitivity of 160% means a belt speed of 12.5 m/s at the maximum output of the lamp.

Example 3

This example illustrates the synthesis of a hyperbranched polyglycidol core derivatized with benzophenone and 4-dimethylaminobenzoic acid.

The photoreactive polymers IS-5 and IS-6 were prepared and can be represented by generalized formula IS-B.

Generalized formula IS-B

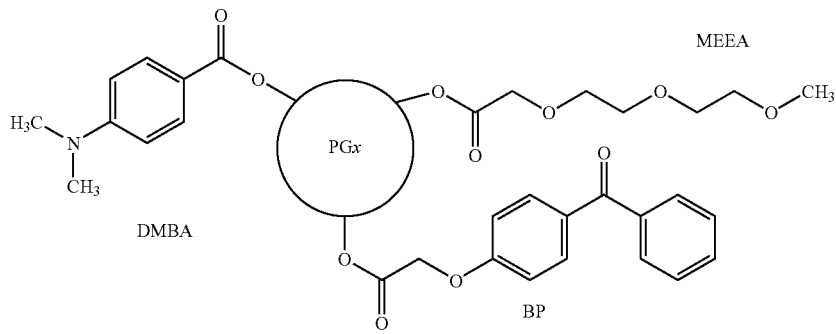

wherein,

PG represents a hyperbranched polyglycidol core x represents the average number of terminal hydroxyl groups in the starting polyglycidol The hyperbranched polyglycidols selected for this example had different molecular weights:

PG$_{17}$: a hyperbranched polyglycidol with 17 hydroxyl groups on average; and

PG$_{33}$: a hyperbranched polyglycidol with 33 hydroxyl groups on average.

The synthesis of IS-5 and IS-6 can be represented by the following reaction scheme:

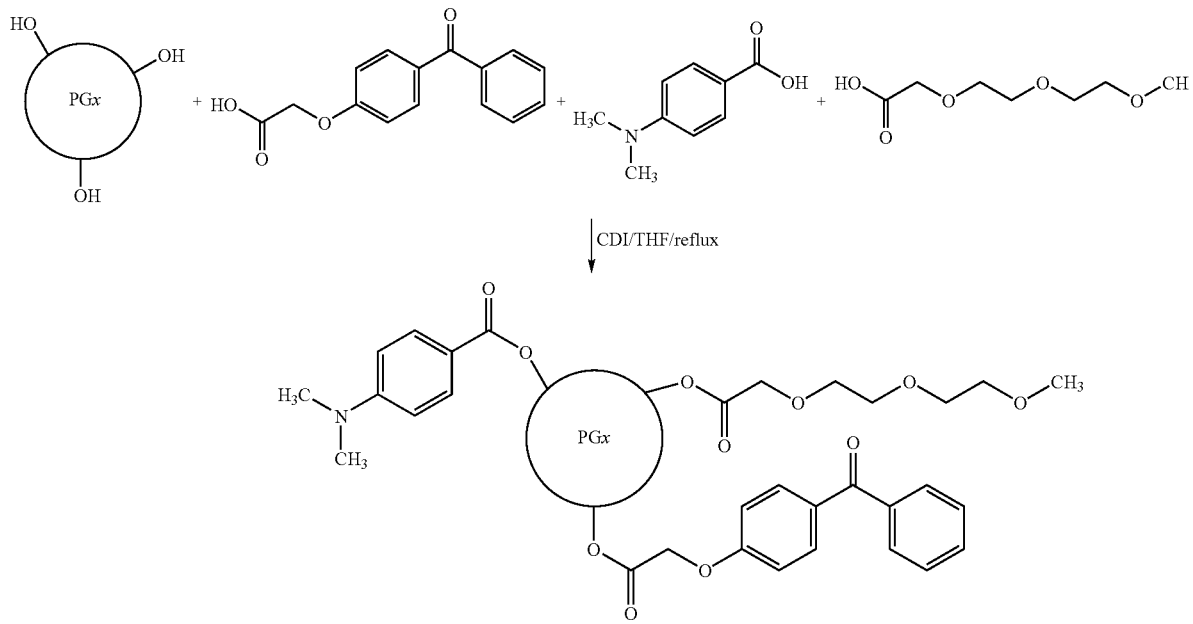

The photoreactive polymers IS-5 and IS-6 were prepared according to Table 14, which mentions the ratio of the different groups acylated onto each starting polyglycidol.

TABLE 14

| Photo-reactive polymer | x | DMBA | MEEA | BP | General formula |
|---|---|---|---|---|---|
| IS-5 | 17 | 4.8 | 7.4 | 4.8 | $PG_{17}BP_{4.8}DMBA_{4.8}MEEA_{7.4}$ |
| IS-6 | 33 | 9.3 | 12.3 | 11.4 | $PG_{33}BP_{11.4}DMBA_{9.3}MEEA_{12.3}$ |

The synthesis is exemplified for the polymer $PG_{17}BP_{4.8}DB_{4.8}MEEA_{7.4}$: A solution of 1.67 g (10.0 mmol) of 4-dimethylaminobenzoic acid (DMBA) and 1.63 (10.0 mmol) of 1,1'-carbonyldiimidazole (CDI) in 20 ml of THF was refluxed for 3 h. Then it was added to the flask containing 1.44 g (1.1 9mmol) of $PG_{17}$ and the mixture was refluxed overnight while stirring. A solution of 2.07 g (8.0 mmol) of p-benzophenoxyacetic acid, 1.23 ml (8.0 mmol) of MEEA and 2.61 g (16.0 mmol) of CDI in 20 ml of THF was stirred at room temperature for 1 h, and then added to the cooled solution of DB partially modified PG. The mixture was stirred at room temperature overnight. Water was added to destroy the residual CDI and CDI activated acids. After removing the solvent under reduced pressure, the residue was dissolved in chloroform. The mixture was washed twice with 2N of HCl aq, three times with deionized water, twice with 10% of NaOH aq and several times with NaCl aq until pH=7. After removing the solvent under reduced pressure, residual water was removed by azeotropical destillation with toluene. After filtration, the toluene was removed under reduced pressure and the residue was kept at 40° C. in vacuum overnight.

$^1$H NMR (CDCl$_3$): d=0.77, 1.32 (TMP core of PG); 1.14-1.64 (β and γ $CH_2$ in piperidine ring); 1.98 ($CH_3COO$—); 2.13-2.66 (α $CH_2$ in piperidine ring, —$NCH_2CH_2COO$—); 2.98-5.42 (protons of PG and MEEA moieties, —$OCH_2COO$—); 6.62-8.05 (protons of aromatic ring of BP moieties).

Example 4

In this example compares the curing efficiency of the photoreactive polymers IS-5 and IS-6 in a radiation curable composition with a combination of a low molecular weight synergist and photoinitiator. The molar ratio of the synergist and photoinitiator was kept constant for both polymers and the low molecular weight comparison. The initiator had the same UV-VIS absorption spectrum as the photoreactive polymers.

The comparative radiation curable compositions COMP-2 and COMP-3 and the inventive radiation curable compositions INV-3 and INV-4 were prepared according to Table 15. The weight % (w %) was based on the total weight of the radiation curable composition.

TABLE 15

| w % of: | COMP-2 | COMP-3 | INV-3 | INV-4 |
|---|---|---|---|---|
| DPGDA ™ | 47.0 | 45.5 | 40.0 | 40.0 |
| Sartomer ™ SR351 | 40.0 | 40.0 | 40.0 | 40.0 |
| Quantacure ™ EHA | 5.5 | 7.0 | — | — |
| Initiator ILM-1 | 5.5 | 5.5 | — | — |
| IS-5 | — | — | 18.0 | — |
| IS-6 | — | — | — | 18.0 |

The comparative radiation curable compositions COMP-2 and COMP-3 and inventive radiation curable compositions INV-3 and INV-4 were coated on an unsubbed 100 μm PET substrate using a bar coater and a 10 μm wired bar. The coatings were covered with an unsubbed 100 μm PET substrate and cured using a Fusion DRSE-120 conveyer, equipped with a Fusion VPS/I600 lamp (D-bulb), which transported the samples under the UV-lamp on a conveyer belt at a speed of 20 m/min. The curing speed was defined as the percentage of the maximum output of the lamp needed to cure the samples. The results are summarized in Table 16.

TABLE 16

| Radiation curable composition | Sensitivity % of maximum output | Viscosity (mPa · s) |
|---|---|---|
| COMP-2 | 50 | 26.6 |
| COMP-3 | 50 | 26.9 |
| INV-3 | 50 | 55.5 |
| INV-4 | 50 | 69.4 |

From Table 16 it can be concluded that the polymeric initiators were as efficient as their low molecular weight counterparts while the viscosity of the formulation stayed within the jettable region.

Example 5

This example illustrates the synthesis of a Boltorn™ H20 derivative as photoreactive polymer for UV-curable compositions.

The photoreactive polymer IS-7 was prepared and can be represented by generalized formula IS-C. Generalized Formula IS-C

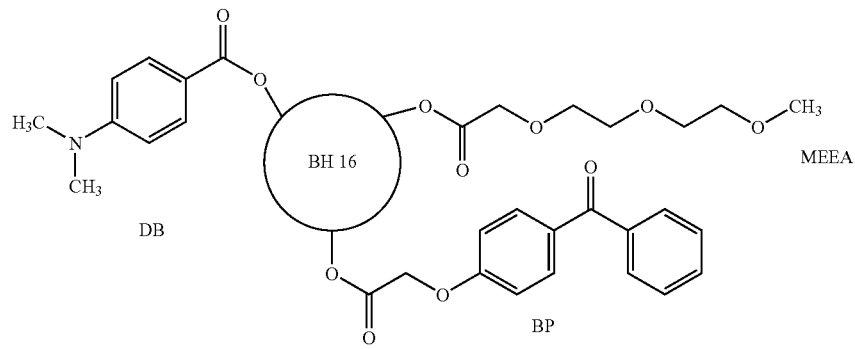

wherein,
BH16 represents Boltorn™ H20 with a functionality of 16 and a Mw (GPC) of 2100.

The synthesis of photoreactive polymer IS-7 can be represented by the following reaction scheme:

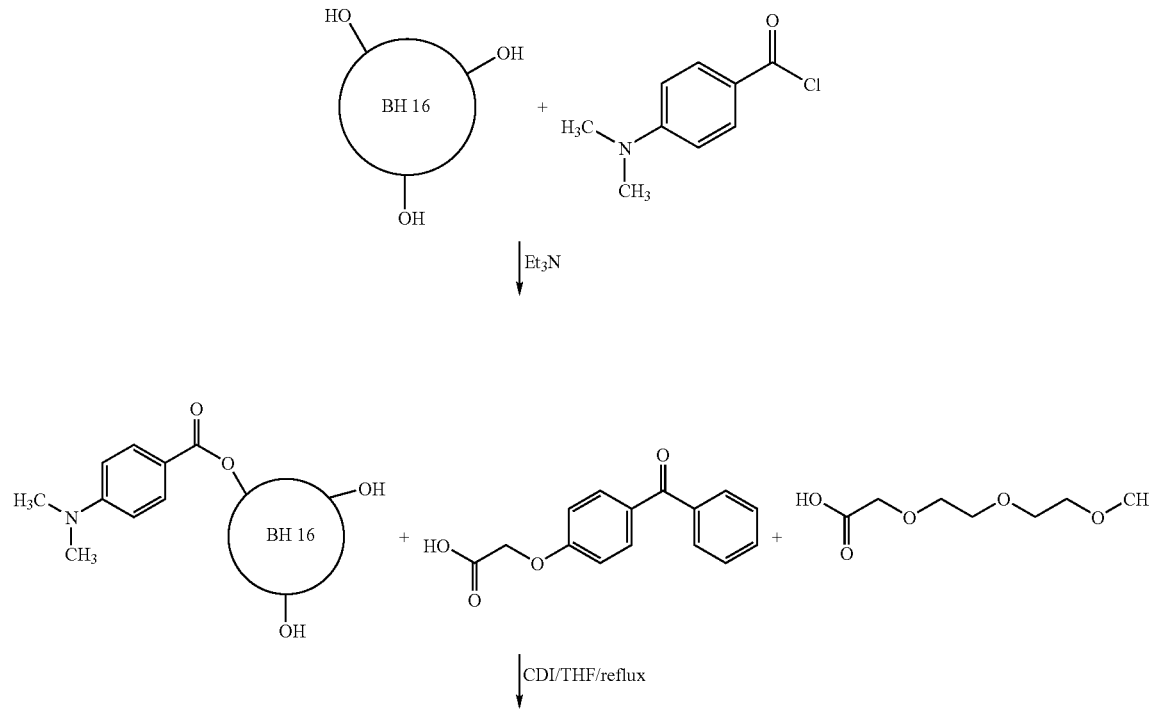

-continued

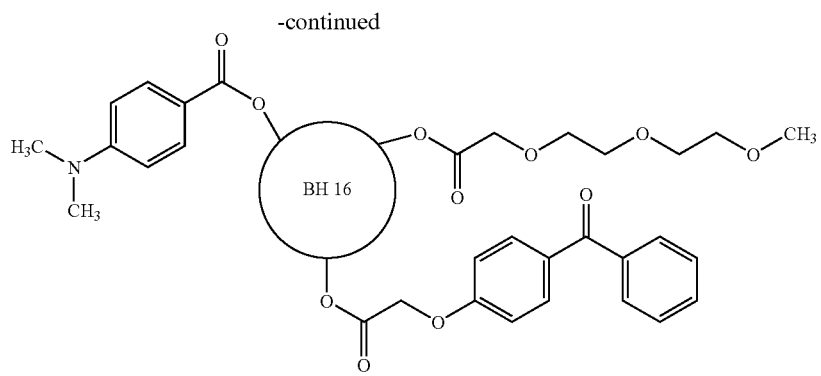

4 g Boltorn™ H20, 2.08 ml (15 mmol) triethylamine and 0.46 g (3.47 mmol) dimethylaminopyridine were dissolved in 40 ml THF. 2.74 g (15 mmol) 4-dimethylaminobenzoyl chloride was added and the solution was refluxed for 30 minutes. The mixture was allowed to cool down to room temperature. 3.79 g (15 mmol) 4-benzophenoxyacetic acid was dissolved in 20 ml THF and 2.43 g (15 mmol) CDI was added and the reaction was allowed to continue for 1 hour at room temperature. This solution was added to the Boltorn™ H20 solution and the mixture was refluxed for 6 hours. The mixture was allowed to cool down to room temperature. 2.31 g (15 mmol) methoxyethoxyethoxyacetic acid was dissolved in 20 ml THF and 2.43 g (15 mmol) CDI was added. The reaction was allowed to continue for 1 hour at room temperature and this solution was added to the solution of Boltorn™ H20. The reaction mixture was refluxed for 20 hours. 2 ml water was added and the solvent was removed under reduced pressure. The residue was redissolved in 100 ml chloroform and extracted twice with 2 N HCl, three times with water, twice with 10% NaOH and several times with brine until pH=7. The chloroform was dried over $MgSO_4$ and the solvent was removed under reduced pressure. The residue was dried under vacuum at 40° C.

The photoreactive polymer IS-7 was prepared according to Table 17, which mentions the ratio of the different groups acylated onto the Boltorn™ H20 core.

TABLE 17

| Photoreactive polymer | BP | DB | MEEA | General formula |
|---|---|---|---|---|
| IS-7 | 5.9 | 6.9 | 3.2 | $BH_{16}BP_{5.9}DB_{6.9}MEEA_{3.2}$ |

The synthesized photoreactive polymer IS-7 displayed properties as disclosed by Table 18.

TABLE 18

| Photoreactive polymer | $M_n$ | Yield |
|---|---|---|
| IS-7 | 4700 | 60% |

Example 6

In this example the photoreactive polymer IS-7 was evaluated in a radiation curable composition.

The curing efficiency of the photoreactive polymer IS-7 was compared with a combination of a low molecular weight photoinitiator and a low molecular weight synergist. The molar ratio of the synergist and photoinitiator was kept constant for both the polymer and the low molecular weight comparison. The initiator had the same UV-VIS absorption spectrum as the photoreactive polymers.

The comparative radiation curable composition COMP-4 and the inventive radiation curable composition INV-5 were prepared according to Table 19. The weight % (wt %) was based on the total weight of the radiation curable composition.

TABLE 19

| wt % of: | COMP-4 | INV-5 |
|---|---|---|
| DPGDA ™ | 43.0 | 40.0 |
| Sartomer ™ SR351 | 40.0 | 40.0 |
| Initiator ILM-2 | 7.5 | — |
| Quantacure ™ EHA | 7.5 | — |
| IS-7 | — | 18.0 |
| Dibutyl phtalate | 2.0 | 2.0 |

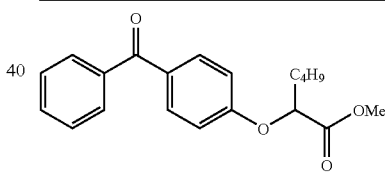

Initiator ILM-2

The comparative radiation curable composition COMP-4 and inventive radiation curable composition INV-5 were coated on an unsubbed 100 μm PET substrate using a bar coater and a 10 μm wired bar. The coatings were covered with an unsubbed 100 μm PET substrate and cured using a Fusion DRSE-120 conveyer, equipped with a Fusion VPS/I600 lamp (D-bulb), which transported the samples under the UV-lamp on a conveyer belt at a speed of 20 m/min. The curing speed was defined as the percentage of the maximum output of the lamp needed to cure the samples. The results are summarized in Table 20.

TABLE 20

| Radiation curable composition | Sensitivity % of maximum output | Viscosity (mPa · s) |
|---|---|---|
| COMP-4 | 50 | 25.3 |
| INV-5 | 50 | 73.0 |

Table 20 shows that the photoreactive polymer IS-7 has a sensitivity, comparable with the low molecular weight reference and a viscosity suitable for ink-jet printing.

Example 7

This example illustrates the synthesis of a hyperbranched polyglycidol core derivatized with carboxythioxanthone and 4-dimethylaminobenzoic acid.

The photoreactive polymer IS-8 was prepared according to Table 21 and can be represented by generalized formula IS-D.

1.67 g (10 mmol) 4-dimethylbenzoic acid was dissolved in 20 ml THF. 1.63 g (10 mmol) CDI was added and the mixture was refluxed for 3 hours. 1.44 g $PG_{33}$ was added and the mixture was refluxed over night while stirring. 2.31 g (8 mmol) of the carboxythioxanthone and 1.23 ml (8 mmol) methoxyethoxyethoxyacetic acid were dissolved in 20 ml THF. 2.61 g (16 mmol) CDI was added and the reaction was allowed to continue for 1 hour at room temperature. This mixture was added to the $PG_{33}$ solution and the reaction was allowed to continue over night at room temperature. 2 ml

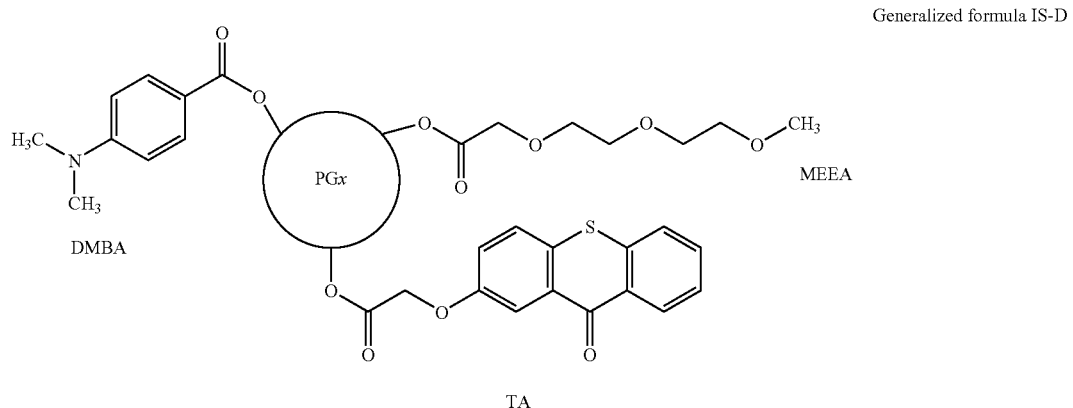

Generalized formula IS-D

The synthesis of photoreactive polymer IS-8 can be represented by the following reaction scheme:

water was added and the solvent was removed under reduced pressure. The residue was redissolved in 50 ml chloroform

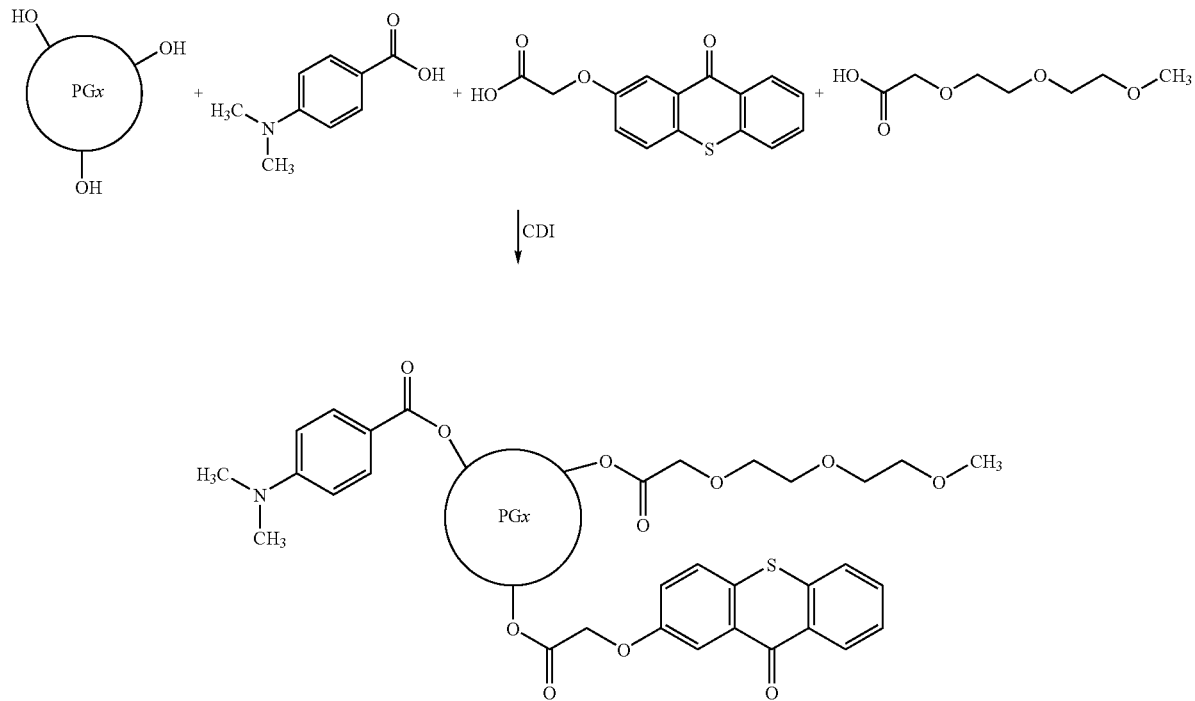

and extracted twice with 2N HCl, three times with water, twice with 10% NaOH and several times with brine until pH=7. The chloroform was dried over MgSO$_4$ and the solvent was removed under reduced pressure. The residue was dried under vacuum at 40° C.

TABLE 21

| Photoreactive polymer | x | TA | DMBA | MEEA | General formula |
|---|---|---|---|---|---|
| IS-8 | 33 | 8.9 | 9.3 | 14.8 | PG$_{33}$TA$_{8.9}$DB$_{9.3}$MEEA$_{14.8}$ |

The synthesized photoreactive polymer IS-8 displayed properties as disclosed by Table 22.

TABLE 22

| Photoreactive polymer | $M_n$ | Yield |
|---|---|---|
| IS-8 | 8450 | 45% |

Example 8

In this example the curing efficiency of the photoreactive polymer IS-8 was evaluated in a radiation curable composition. The inventive radiation curable composition INV-6 was prepared according to Table 23. The weight % (w %) was based on the total weight of the radiation curable composition.

TABLE 23

| wt % of: | INV-6 |
|---|---|
| DPGDA ™ | 40 |
| Sartomer ™ SR351 | 40 |
| IS-8 | 18 |
| Dibutyl phtalate | 2 |

The inventive radiation curable composition INV-6 was coated on an unsubbed 100 μm PET substrate using a bar coater and a 10 μm wired bar. The coating was covered with an unsubbed 100 μm PET substrate and cured using a Fusion DRSE-120 conveyer, equipped with a Fusion VPS/I600 lamp (D-bulb), which transported the samples under the UV-lamp on a conveyer belt at a speed of 20 m/min. The curing speed was defined as the percentage of the maximum output of the lamp needed to cure the samples. The results are summarized in Table 24.

TABLE 24

| Radiation curable composition | Sensitivity % of maximum output | Viscosity (mPa · s) |
|---|---|---|
| INV-6 | 50 | 20.1 |

Table 24 shows that the photoreactive polymer IS-8 has a good sensitivity, and a viscosity suitable for ink-jet printing.

Example 9

This example illustrates the synthesis of a hyperbranched polyglycidol core derivatized with 2 different initiating functional groups and a co-initiating functional group.

The photoreactive polymers IS-9 to IS-12 were prepared according to Table 25 and can be represented by generalized formula IS-E.

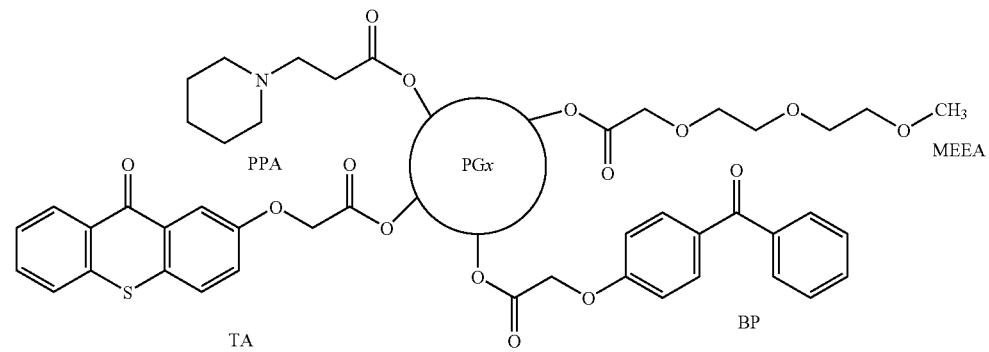

Generalized formula IS-E

TABLE 25

| Photoreactive polymer | x | General formula |
|---|---|---|
| IS-9 | 17 | PG$_{17}$TA$_{2.1}$BP$_{2.2}$PPA$_5$MEEA$_{7.7}$ |
| IS-10 | 33 | PG$_{33}$TA$_{4.5}$BP$_{4.4}$PPA$_{8.9}$MEEA$_{15.2}$ |
| IS-11 | 83 | PG$_{83}$TA$_{12}$BP$_{13}$PPA$_{26}$MEEA$_{32}$ |
| IS-12 | 179 | PG$_{179}$TA$_{27}$BP$_{21}$PPA$_{63}$MEEA$_{68}$ |

The synthesis is exemplified for PG$_{17}$TA$_{2.1}$BP$_{2.2}$PPA$_5$MEEA$_{7.7}$. A mixture of 2.05 g PG$_{17}$, 1.1 g (4.29 mmol) 4-benzophenoxyacetic acid, 1.35 g (8.57mmol) 2-piperidinopropionic acid, 1.23 (4.29) 2-thioxanthonoacetic acid and 2.18 g (11.4 mmol) p.-toluene sulfonic acid were dissolved in 40 ml toluene. The mixture was refluxed for 2 hours, while water was removed azeotropically. After 2 hours, 2.65 ml (17.1 mmol) methoxyethoxyethoxyacetic acid was added and water was removed azeotropically for an additional 4 hours. The solvent was removed under reduced pressure and the residue was redissolved in 100 ml chloroform.

The mixture was extracted twice with 10% NaOH and several times with brine until pH=7. The chloroform was dried over MgSO$_4$ and the solvent was removed under reduced pressure. The residue was dried under vacuum at 40°

C. The other polymers were prepared according to a similar scheme. The yield and molecular weight is shown in Table 26.

TABLE 26

| Photoreactive polymer | $M_n$ | Yield |
| --- | --- | --- |
| IS-9 | 4230 | 86% |
| IS-10 | 8400 | 45% |
| IS-11 | 21000 | 57% |
| IS-12 | 45000 | 52% |

Example 10

The curing efficiency of photoreactive polymers IS-9 and IS-10 was evaluated in a radiation curable composition. The inventive radiation curable formulations INV-7 and INV-8 were prepared according to Table 27. The weight % (wt %) was based on the total weight of the radiation curable composition.

TABLE 27

| wt % of: | INV-7 | INV-8 |
| --- | --- | --- |
| DPGDA ™ | 40 | 40 |
| Sartomer ™ R351 | 40 | 40 |
| IS-9 | 18 | — |
| IS-10 | — | 18 |
| Dibutyl phtalate | 2 | 2 |

The radiation curable compositions were coated on an unsubbed 100 μm PET substrate using a bar coater and a 10 μm wired bar. The coatings were covered with an unsubbed 100 μm PET substrate and cured using a Fusion DRSE-120 conveyer, equipped with a Fusion VPS/I600 lamp (D-bulb), which transported the samples under the UV-lamp on a conveyer belt at a speed of 20 m/min. The curing speed was defined as the percentage of the maximum output of the lamp needed to cure the samples. The results are summarized in Table 28.

TABLE 28

| Radiation curable composition | Sensitivity % of maximum output | Viscosity (mPa · s) |
| --- | --- | --- |
| INV-7 | 25 | 40.6 |
| INV-8 | 50 | 37.8 |

Table 28 show that the inventive radiation curable compositions INV-7 and INV-8 exhibit a good sensitivity and a viscosity suitable for ink-jet printing.

Example 11

In this example, the influence of the molecular weight on viscosity for a hyperbranched photoreactive polymer is illustrated. The photoreactive polymers IS-1 to IS-4 have been formulated into the inventive radiation curable compositions INV-9 to INV-12 according to Table 29.

TABLE 29

| wt % of: | INV-9 | INV-10 | INV-11 | INV-12 |
| --- | --- | --- | --- | --- |
| DPGDA ™ | 40 | 40 | 40 | 40 |
| Sartomer ™ SR351 | 40 | 40 | 40 | 40 |
| Is-1 | 18 | — | — | — |
| IS-2 | — | 18 | — | — |
| IS-3 | — | — | 18 | — |
| IS-4 | — | — | — | 18 |
| Dibutyl phtalate | 2 | 2 | 2 | 2 |

The inventive radiation curable compositions INV-9 to INV-12 were coated on an unsubbed 100 μm PET substrate using a bar coater and a 10 μm wired bar. The coatings were covered with an unsubbed 100 μm PET substrate and cured using a Fusion DRSE-120 conveyer, equipped with a Fusion VPS/I600 lamp (D-bulb), which transported the samples under the UV-lamp on a conveyer belt at a speed of 20 m/min. The curing speed was defined as the percentage of the maximum output of the lamp needed to cure the samples. The results are summarized in Table 30.

TABLE 30

| Radiation curable composition | Sensitivity % of maximum output | Viscosity (mPa · s) |
| --- | --- | --- |
| INV-9 | 50 | 53.4 |
| INV-10 | 50 | 75.4 |
| INV-11 | 50 | 54.4 |
| INV-12 | 50 | 48.9 |

From Table 30 it is clear that even very high functional hyperbranched photoreactive polymers maintain their photoreactivity without influencing the formulation visocity to a very high extend.

Having described in detail preferred embodiments of the current invention, it will now be apparent to those skilled in the art that numerous modifications can be made therein without departing from the scope of the invention as defined in the following claims.

The invention claimed is:

1. A photoreactive polymer comprising a dendritic polymer core with at least one initiating functional group and at least one co-initiating functional group, wherein said at least one co-initiating functional group is a co-initiating functional group selected from the group consisting of an aliphatic amine, an aromatic amine and a thiol.

2. The photoreactive polymer according to claim 1, wherein said at least one initiating functional group is selected from the group consisting of benzophenones, thioxanthones, 1,2-diketones and anthraquinones.

3. The photoreactive polymer according to claim 2, wherein said dendritic polymer core has at least one other functional group.

4. The photoreactive polymer according to claim 3, wherein said at least one other functional group is a compatibilizing group to improve the compatibility of the photoreactive polymer with a radiation curable composition.

5. The photoreactive polymer according to claim 4, wherein said dendritic polymer core is a hyperbranched polymer core.

6. A photoreactive polymer comprising a dendritic polymer core with at least one initiating functional group and at least one co-initiating functional group, wherein said at least one co-initiating functional group is a co-initiating functional group selected from the group consisting of tertiary amines, heterocyclic thiols and 4-dialkylamino-benzoic acid and 4-dialkylamino-benzoic acid derivatives.

7. The photoreactive polymer according to claim 6, wherein said at least one initiating functional group is selected from the group consisting of benzophenones, thioxanthones, 1,2-diketones and anthraquinones.

8. The photoreactive polymer according to claim 7, wherein said dendritic polymer core has at least one other functional group.

9. The photoreactive polymer according to claim 8, wherein said at least one other functional group is a compatibilizing group to improve the compatibility of the photoreactive polymer with a radiation curable composition.

10. The photoreactive polymer according to according to claim 1, wherein said photoreactive polymer has at least three initiating functional groups on the dendritic polymer core.

11. The photoreactive polymer according to claim 1, wherein said photoreactive polymer has at least three co-initiating functional groups on the dendritic polymer core.

12. The photoreactive polymer according to claim 11, wherein said dendritic polymer core has at least one other functional group.

13. The photoreactive polymer according to claim 12, wherein said at least one other functional group is a compatibilizing group to improve the compatibility of the photoreactive polymer with a radiation curable composition.

14. The photoreactive polymer according to claim 1, wherein said dendritic polymer core is a hyperbranched polymer core.

15. The photoreactive polymer according to claim 1, wherein said dendritic polymer core has at least one other functional group.

16. The photoreactive polymer according to claim 15, wherein said at least one other functional group is a compatibilizing group to improve the compatibility of the photoreactive polymer with a radiation curable composition.

17. The photoreactive polymer according to claim 6, wherein said dendritic polymer core is a hyperbranched polymer core.

18. The photoreactive polymer according to claim 17, wherein said hyperbranched polymer core has a polydispersity $M_W/M_n$ smaller than 3.

19. The photoreactive polymer according to claim 18, wherein said hyperbranched polymer core is a polyglycidol.

20. A process for manufacturing a photoreactive polymer, comprising the steps of:
   a) providing a dendritic polymer core,
   b) attaching at least one co-initiator or co-initiator derivative functional group to said dendritic polymer core, and
   c) attaching at least one initiator or initiator derivative functional group to said dendritic polymer core, wherein said at least one co-initiator or initiator functional group is a co-initiator or initiator functional group selected from the group consisting of an aliphatic amine, an aromatic amine and a thiol.

21. The process for manufacturing a photoreactive polymer according to claim 20, wherein said dendritic polymer core is a hyperbranched polymer core.

22. The process for manufacturing a photoreactive polymer according to claim 21, wherein said hyperbranched polymer core has a polydispersity $M_W/M_n$ smaller than 3.

23. The process for manufacturing a photoreactive polymer according to claim 22, wherein said hyperbranched polymer core is a polyglycidol.

24. A process for manufacturing a photoreactive polymer, comprising the steps of:
   a) providing a dendritic polymer core wherein a co-initiator functional group is part of the dendritic polymer core, and
   b) attaching at least one initiator or initiator derivative functional group to said dendritic polymer core, wherein said co-initiator functional group is a co-initiating functional group selected from the group consisting of tertiary amines, heterocyclic thiols and 4-dialkylamino-benzoic acid and 4-dialkylamino-benzoic acid derivatives.

25. The process for manufacturing a photoreactive polymer according to claim 24, wherein said dendritic polymer core is a hyperbranched polymer core.

26. The process for manufacturing a photoreactive polymer according to claim 25, wherein said hyperbranched polymer core has a polydispersity $M_W/M_n$ smaller than 3.

27. The photoreactive polymer according to claim 1, wherein the dendritic polymer core is a hyperbranched polymer core and wherein the at least one initiating functional group is present on the hyperbranched polymer core as an end group.

28. The photoreactive polymer according to claim 27, wherein the at least one co-initiating functional group is part of the hyperbranched polymeric core.

29. The photoreactive polymer according to claim 1, comprising at least five initiating functional groups on the dendritic polymer core.

30. The photoreactive polymer according to claim 6, wherein the dendritic polymer core is a hyperbranched polymer core, and wherein the at least one initiating functional group is present on the hyperbranched polymer core as an end group.

31. The photoreactive polymer according to claim 6, wherein the at least one co-initiating functional group is part of the hyperbranched polymeric core.

* * * * *

UNITED STATES PATENT AND TRADEMARK OFFICE
CERTIFICATE OF CORRECTION

| | | |
|---|---|---|
| PATENT NO. | : 7,538,144 B2 | Page 1 of 1 |
| APPLICATION NO. | : 11/170349 | |
| DATED | : May 26, 2009 | |
| INVENTOR(S) | : Vanmaele et al. | |

It is certified that error appears in the above-identified patent and that said Letters Patent is hereby corrected as shown below:

<u>ON THE TITLE PAGE ITEM [75]</u>

In the Inventors section, the name of the second inventor should be corrected from "Loccufoer" to --Loccufier--.

Signed and Sealed this

Thirteenth Day of July, 2010

David J. Kappos
*Director of the United States Patent and Trademark Office*